(12) United States Patent
Davis et al.

(10) Patent No.: US 12,610,203 B2
(45) Date of Patent: Apr. 21, 2026

(54) TALKER-SPECIFIC TUNING OF HEARING ASSISTANCE DEVICE

(71) Applicant: QUALCOMM Incorporated, San Diego, CA (US)

(72) Inventors: Graham Bradley Davis, Seattle, WA (US); Ashwin Pillay, Pittsburgh, PA (US); Shankar Thagadur Shivappa, San Diego, CA (US); Arvind Krishna Sridhar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/544,741

(22) Filed: Dec. 19, 2023

(65) Prior Publication Data

US 2025/0203303 A1 Jun. 19, 2025

(51) Int. Cl.
| | |
|---|---|
| *H04R 25/00* | (2006.01) |
| *G10L 17/04* | (2013.01) |
| *G10L 21/02* | (2013.01) |
| *G10L 25/51* | (2013.01) |

(52) U.S. Cl.
CPC .............. *H04R 25/70* (2013.01); *G10L 17/04* (2013.01); *G10L 21/02* (2013.01); *G10L 25/51* (2013.01); *H04R 25/505* (2013.01); *H04R 2225/39* (2013.01); *H04R 2225/41* (2013.01); *H04R 2225/43* (2013.01)

(58) Field of Classification Search
CPC ......... G10L 21/02; G10L 25/51; G10L 17/00; H04R 25/70; H04R 25/505; H04R 2225/39; H04R 2225/41; H04R 2225/43; H04R 2225/55; H04R 25/507
See application file for complete search history.

(56) References Cited

U.S. PATENT DOCUMENTS

| | | | | |
|---|---|---|---|---|
| 9,124,990 | B2 * | 9/2015 | Strelcyk | H04R 25/50 |
| 2015/0271607 | A1 * | 9/2015 | Sabin | H04R 25/70 |
| | | | | 381/314 |
| 2018/0242090 | A1 | 8/2018 | Sigwanz et al. | |
| 2018/0324516 | A1 | 11/2018 | Campbell et al. | |
| 2023/0076871 | A1 | 3/2023 | Müller et al. | |

FOREIGN PATENT DOCUMENTS

EP           3667658 A1 *    6/2020    ........... H04R 25/505

OTHER PUBLICATIONS

Hearing Augmentation Systems and Methods (Year: 2017).*
O'Connor, "An Escape From the Noise", NTT, Oct. 6, 2023, 4 pgs.
Coxworth, "SpeakerBeam Hearing Aid Tech Only Amplifies Specific People's Voices", NTT, newatlas.com, Oct. 16, 2023, 2 pgs.

* cited by examiner

*Primary Examiner* — Brian Ensey
(74) *Attorney, Agent, or Firm* — QUALCOMM Incorporated; Espartaco Diaz Hidalgo

(57) ABSTRACT

A device includes a memory configured to store audio data and one or more processors configured to obtain audio data for playout to a user and obtain hearing assistance settings that are based on voice characteristics of a target talker associated with the audio data and based on hearing characteristics of the user. The one or more processors are configured to configure a hearing assistance device to adjust playout audio characteristics of the audio data based on the hearing assistance settings.

20 Claims, 12 Drawing Sheets

HEARING ASSISTANCE DEVICE CONTROLLER 140

TALKER-SPECIFIC DATA 150

TALKER IDENTIFIER 402

DATABASE 132

TALKER PROFILE FOUND? 404

NO     YES

MANUAL FINE-TUNING INPUT 302

ML TUNING MODEL 202

HEARING ASSISTANCE SETTINGS 160

HEARING ASSISTANCE DEVICE 110

700

708

710

| SIGNAL INPUT 704 | SIGNAL OUTPUT 706 |

PROCESSOR(S) 190

| AUDIO PROCESSOR 114 | HEARING ASSISTANCE DEVICE CONTROLLER 140 |

702

800

808

804

140

802

806

1500

1502

OBTAIN AUDIO DATA FOR PLAYOUT TO A USER

1504

OBTAIN HEARING ASSISTANCE SETTINGS THAT ARE BASED ON VOICE CHARACTERISTICS OF A TARGET TALKER ASSOCIATED WITH THE AUDIO DATA AND BASED ON HEARING CHARACTERISTICS OF THE USER

1506

CONFIGURE A HEARING ASSISTANCE DEVICE TO ADJUST PLAYOUT AUDIO CHARACTERISTICS OF THE AUDIO DATA BASED ON THE HEARING ASSISTANCE SETTINGS

TALKER-SPECIFIC TUNING OF HEARING ASSISTANCE DEVICE

I. FIELD

The present disclosure is generally related to hearing assistance devices.

II. DESCRIPTION OF RELATED ART

Hearing loss is unique to the individual, and hearing assistance algorithms are fine-tuned for each user's needs and/or preferences. Traditional approaches to tuning hearing assistance devices are generally manual and tedious. For example, a professional, such as an audiologist, tests the user to generate an audiogram (or an equivalent hearing loss profile) using audiometry or similar testing. The professional sets parameters of the hearing assistance device and subsequently, during a fitting appointment, the professional interacts with the user to fine-tune the parameters based on the preferences of the user. Alternatively, the user can manually select among preset parameters.

A user's needs and/or preferences may be different for different contexts (e.g., the type of content being listened to, the noise environment, etc.). Some hearing assistance systems are able to provide context-dependent hearing assistance. For example, many hearing assistance systems enable a user to manually fine tune the hearing assistance settings during use. As another example, some hearing assistance systems automatically detect certain contexts, and perform mode switching among a set of preconfigured modes, where each mode is associated with a set of hearing assistance settings. As another example, some hearing assistance systems determine the hearing assistance settings for a variety of contexts during initial set up and programming of the hearing assistance device.

III. SUMMARY

According to particular implementations disclosed herein, a device includes a memory configured to store audio data and one or more processors configured to obtain audio data for playout to a user and obtain hearing assistance settings that are based on voice characteristics of a target talker associated with the audio data and based on hearing characteristics of the user. The one or more processors are configured to configure a hearing assistance device to adjust playout audio characteristics of the audio data based on the hearing assistance settings.

According to particular implementations disclosed herein, a method includes obtaining audio data for playout to a user and obtaining hearing assistance settings that are based on voice characteristics of a target talker associated with the audio data and based on hearing characteristics of the user. The method includes configuring a hearing assistance device to adjust playout audio characteristics of the audio data based on the hearing assistance settings.

According to particular implementations disclosed herein, a non-transitory computer-readable storage device stores instructions that are executable by one or more processors to cause the one or more processors to obtain audio data for playout to a user and obtain hearing assistance settings that are based on voice characteristics of a target talker associated with the audio data and based on hearing characteristics of the user. The instructions are executable to cause the one or more processors to configure a hearing assistance device to adjust playout audio characteristics of the audio data based on the hearing assistance settings.

According to particular implementations disclosed herein, an apparatus includes means for obtaining audio data for playout to a user and means for obtaining hearing assistance settings that are based on voice characteristics of a target talker associated with the audio data and based on hearing characteristics of the user. The apparatus includes means for configuring a hearing assistance device to adjust playout audio characteristics of the audio data based on the hearing assistance settings.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
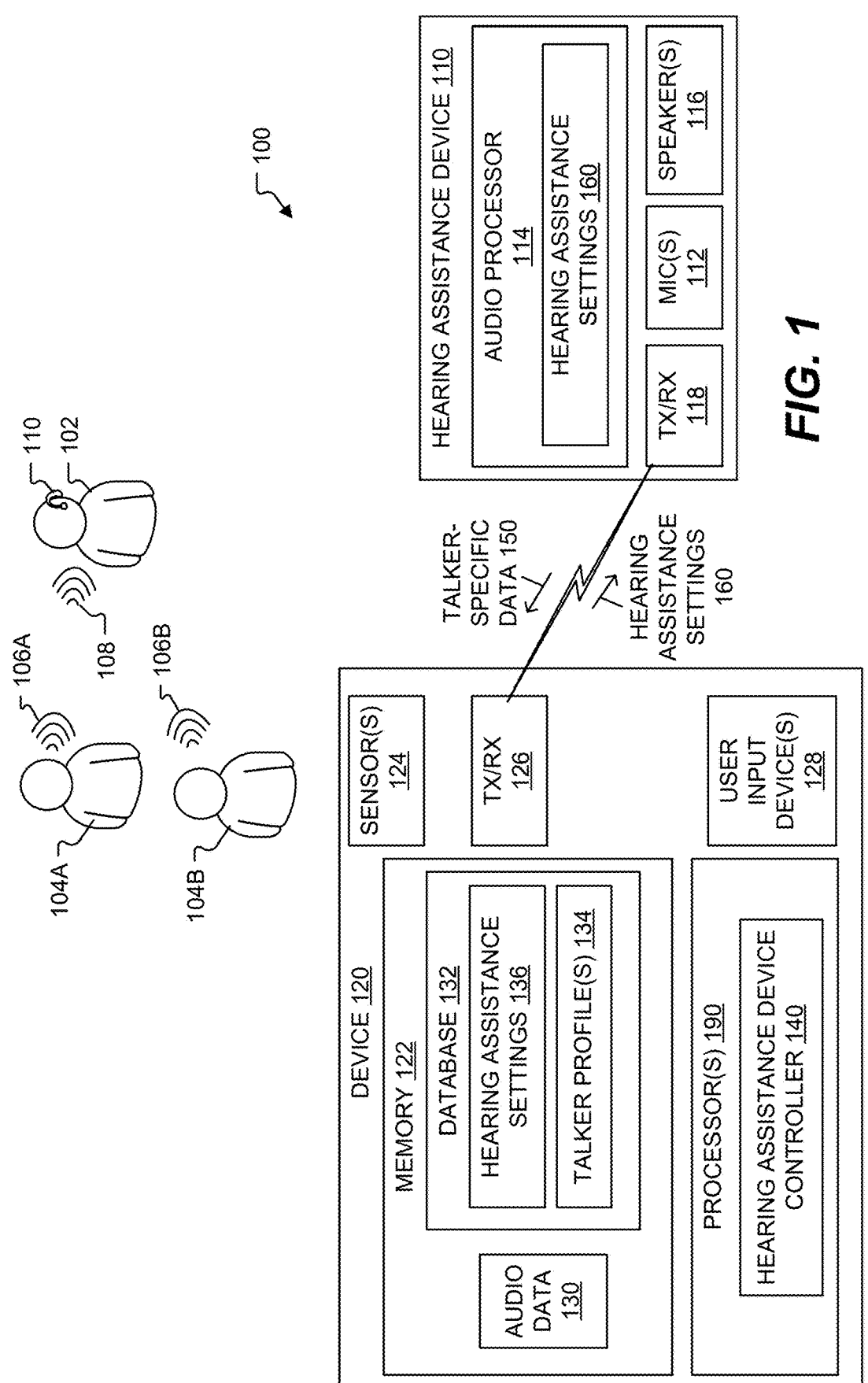
FIG. 1 is a diagram of a particular illustrative aspect of a system configured to adjust hearing assistance settings of a hearing assistance device in accordance with some examples of the present disclosure.

The disclosed system automatically adjusts hearing assistance settings of a user's hearing assistance device based on a talker with whom the user is interacting. Adjusting the hearing assistance settings adjusts playout audio characteristics of the audio data by the hearing assistance device. The hearing assistance settings can include, for example, spectral processing parameter(s), filter parameter(s), directional audio parameter(s), noise suppression parameter(s), or a combination thereof, which can be generated via manual tuning or automatic tuning (e.g., machine-learning (ML)-based tuning).

Determining hearing assistance settings based on the talker improves intelligibility of speech of the talker. For example, when the user is speaking with a mixed group of people, the group can include people with very different voice pitch and/or volume. In this situation, the user is in a single context, but the sounds that the user is listening to (i.e., speech from different talkers) vary widely between talkers. As a result, hearing assistance settings that are otherwise ideal for the context may nevertheless not work well for speech of one or more talkers of the group.

To solve this problem, a device disclosed herein stores talker profiles that are associated with hearing assistance settings. Each set of hearing assistance settings is based, at least partially, on the voice characteristics of a corresponding talker. The device obtains talker-specific data and uses the talker-specific data to configure the hearing assistance settings of a hearing assistance device. For example, the device can access a database that maps talker profiles to corresponding hearing assistance settings, where each talker profile is associated with corresponding talker-specific data.

When the database includes a talker profile matching (e.g., identical to or sufficiently similar to) the talker-specific data, the hearing assistance settings used to configure the hearing assistance device correspond to hearing assistance settings associated with the talker profile. The talker profile can be unique to a particular person or can be associated with a group of people who have similar voice characteristics. If the database does not include a talker profile that matches the talker-specific data, the device can generate a new talker profile for the talker. Hearing assistance settings for the new talker profile can be generated manually by the user (e.g., via manual fine-tuning) or automatically by an ML tuning model.

The talker-specific data can include audio features extracted from audio data including speech of the talker, image(s) captured concurrently with capture of the audio data, sensor data captured concurrently with capture of the audio data, metadata (e.g., caller identification (ID) data or an active speaker ID associated with a communication session) associated with the audio data, or a combination thereof. In some instances, the talker-specific data can be multimodal, such as including audio data and metadata or audio data and an image or other sensor data.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 120 including one or more processors ("processor(s)" 190 of FIG. 1), which indicates that in some implementations the device 120 includes a single processor 190 and in other implementations the device 120 includes multiple processors 190. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 12, multiple microphones are illustrated and associated with reference numbers 1222A, 1222B, and 1222C. When referring to a particular one of these microphones, such as a microphone 1222A, the distinguishing letter "A" is used. However, when referring to any arbitrary one of these microphones or to these microphones as a group, the reference number 1222 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "obtaining," "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "obtaining," "generating," "calculating," "estimating," "using," "selecting," "accessing," and "determining" may be used interchangeably. For example, "obtaining," "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 shows illustrative aspects of a system 100 that includes a hearing assistance device 110 and a device 120 to configure hearing assistance settings 160 of the hearing assistance device 110 based on talker-specific data 150. The hearing assistance device 110 is associated with a user 102 and configured based in part on hearing characteristics of the user 102. For example, the hearing characteristics of the user can include preferences of the user as well as measured frequency-specific hearing capabilities of the user 102 (e.g., as indicated by an audiogram of the user 102). The hearing characteristics of the user 102 may be different for different environmental conditions (e.g., noisy environments as compared to quiet environments), for different types of audio content (e.g., speech as compared to music), etc.

In a particular aspect, the hearing assistance device 110 includes a wearable device (e.g., a head-mounted, on-ear, in-ear, or over-ear device) configured to provide output audio to improve the hearing of the user 102. In the example illustrated in FIG. 1, the hearing assistance device 110 includes one or more microphones 112, an audio processor 114, and one or more speakers 116. Optionally, the hearing assistance device 110 can also include a transceiver 118 and/or other components. As an example of other components that can be included in the hearing assistance device 110, in some embodiments, the device 120 (or aspects thereof) can optionally be included in the hearing assistance device 110.

The microphone(s) 112 are configured to capture sound 108 in an environment around the user 102. For example, the sound 108 can include speech from one or more people (e.g., speech 106A from talker 104A, speech 106B from talker 104B, or both) and other sounds, such as background noise, wind noise, etc. The microphone(s) 112 generate audio data representing the sound 108 (e.g., audio data 130) and provide the audio data to the audio processor 114 for processing based on the hearing assistance settings 160. The hearing assistance settings 160 are based on the hearing characteristics of the user 102 and are updated or changed from time to time based on adjustments provided by the user 102, changes in the context of the user 102, other factors, or a combination thereof.

In a particular aspect, when the user 102 is speaking with one or more other people (e.g., one or more of the talkers 104), the hearing assistance settings 160 can be based on voice characteristics of a target talker. In this context, a "target talker" is a person to whom the user 102 is attending (e.g., the talker 104 whose speech 106 the user 102 is listening to). When more than one talker 104 is present and speaking, the target talker can be automatically selected by the hearing assistance device 110 or the device 120 based on factors such as which talker 104 is recognized, an orientation of the user 102 relative to the talkers 104 (e.g., which talker 104 the user 102 is facing), which talker's speech 106 is dominant, settings specified by the user 102, or other factors. Processing the audio data based on voice characteristics of the target talker and the hearing characteristics of the user 102 improves intelligibility of the speech 106 of the target talker as compared to processing the audio data using general-purpose hearing assistance settings.

The audio processor 114 is configured to modify the audio data 130 representing the sound 108 to generate output audio for playout to the user 102 via the speaker(s) 116. The specific operations performed by the audio processor 114 to modify the audio data 130 depend on the hearing assistance settings 160. Examples of operations that may be performed by the audio processor 114 include, without limitation, noise suppression, audio filtering, beamforming (or other directional audio processing), volume adjustment, frequency-dependent gain adjustment, speech augmentation, various types of spectral processing, or combinations thereof. In addition to modifications directed to improving the user's perception of the audio data, in some embodiments, the audio processor 114 can optionally provide other functions, such as blending audio from two or more sources (e.g., to enable the user 102 to hear sound in the environment around the user 102 as well as call audio during a telephone call).

In the example illustrated in FIG. 1, the hearing assistance device 110 includes the optional transceiver 118 ("TX/RX" in FIG. 1) to enable communication between the hearing assistance device 110 and one or more other devices, such as the device 120. The communication can be wired or wireless. For example, the communication can be via a local area or a wide area wireless network protocol, such as a BLUETOOTH® communication protocol, a WI-FI® communication protocol, an LTE communication protocol, a 5G communication protocol, etc. (BLUETOOTH is a registered trademark of Bluetooth SIG, Inc., a Delaware Corporation; WI-FI is a registered trademark of the Wi-Fi Alliance Corp., a California corporation; and LTE is a trademark of European Telecommunications Standards Institute.)

When present, the transceiver 118 can be used to exchange information related to processing the audio data 130. For example, in some embodiments, the device 120 is separate from the hearing assistance device 110, and the device 120 exchanges information with the hearing assistance device 110 to set the hearing assistance settings 160. To illustrate, in such embodiments, the hearing assistance device 110 can be an in-ear, on-ear, or over-ear device, and the device 120 can correspond to a mobile computing device (e.g., a smartphone or a smartwatch) that supports the hearing assistance device 110. In such embodiments, the hearing assistance device 110 can be relatively small and light-weight and may thus have reduced battery capacity and/or reduced processing capabilities relative to the device 120. In such embodiments, offloading some processing tasks to the device 120 conserves power and processing resources of the hearing assistance device 110.

In the example illustrated in FIG. 1, the transceiver 118 is illustrated as sending the talker-specific data 150 from the hearing assistance device 110 to the device 120 and receiving the hearing assistance settings 160 from the device 120. In various examples, the transceiver 118 can send the audio data 130, the talker-specific data 150, information identifying the hearing assistance settings 160 being used by the audio processor 114, user input information, other information related to processing the audio data 130, or a combination thereof. Further, in the example illustrated in FIG. 1, the transceiver 118 is illustrated as receiving, from a transceiver 126 of the device 120, the hearing assistance settings 160. In various examples, in addition to, or instead of, the hearing assistance settings 160, the transceiver 118 can receive user input information, talker profile data (e.g., one or more talker profiles 134), sensor data from one or more sensors 124 of the device, other information related to configuring the hearing assistance device or processing the audio data 130, or a combination thereof.

In FIG. 1, the device 120 includes a memory 122 and one or more processors 190 coupled to the memory 122. The device 120 optionally also includes the transceiver 126, one or more sensors 124, and one or more user input devices 128. As explained above, in some embodiments, the device 120 is integrated within the hearing assistance device 110, in which case the transceiver 126 may be omitted, and the audio processor 114 can include, be included within, or correspond to one of the processor(s) 190.

In FIG. 1, the sensor(s) 124 can include cameras, contextual sensors (e.g., position sensors, orientation sensors, etc.), or other types of sensors that generate sensor data useful for determining the hearing assistance settings 160. To illustrate, when the sensor(s) 124 include a camera, the sensor data can include images that can be used to determine the location of the user 102 and/or to identify a target talker (e.g., using facial recognition). As another illustrative example, when the sensor(s) 124 include position sensors (e.g., global or local positioning system sensors), the sensor data can include location coordinates that can be used to determine a context of the user 102 (e.g., is the user 102 in a high traffic area, in a store, at home, etc.). In this illustrative example, the context of the user 102 can be used with other data to determine the hearing assistance settings 160.

The user input device(s) 128 can include buttons (e.g. physical buttons or soft buttons), sliders, switches, displays, etc. As one example, the user input device(s) 128 can include a touchscreen display on which a graphical user interface (GUI) can be displayed. In this example, the GUI can include control options associated with the hearing assistance device 110. To illustrate, by interacting with the GUI, the user 102 can provide user input directly controlling at least some of the hearing assistance settings 160. Additionally, or alternatively, the user input can be used with other data to determine the hearing assistance settings 160, as described further below.

In FIG. 1, the processor(s) 190 include a hearing assistance device controller 140, which can include or correspond to instructions stored at the memory 122 and executable by the processor(s) 190 to determine the hearing assistance settings 160. In some embodiments, aspects of the hearing assistance device controller 140 can be implemented directly in hardware or in firmware, such as by one or more field-programmable gate array (FPGA) devices, one or more application-specific integrated circuits (ASICs), or other logic circuits.

In a particular aspect, the hearing assistance device controller 140 is operable to obtain the hearing assistance settings 160 based on voice characteristics of a target talker associated with the audio data 130 and based on hearing characteristics of the user 102. In some embodiments, the hearing assistance device controller 140 obtains the hearing assistance settings 160 by retrieving the hearing assistance settings 160 from the memory 122 (e.g., from a database 132 that includes hearing assistance settings 136). In some embodiments, the hearing assistance device controller 140 obtains the hearing assistance settings 160 by determining the hearing assistance settings 160 using one or more ML tuning models. In some embodiments, the hearing assistance device controller 140 obtains the hearing assistance settings 160 using retrieval operations and the ML tuning model(s). For example, in some such embodiments, the hearing assistance device controller 140 uses the ML tuning model(s) to determine the hearing assistance settings 160 in response to a determination that the database 132 does not include a talker profile 134 associated with the talker-specific data 150. Various embodiments of the hearing assistance device controller 140 are described in more detail with reference to FIGS. 2-6.

The hearing assistance settings 160 include parameters, configuration settings, or other data that control and/or constrain processing performed by the audio processor 114 to generate output audio for playout to the user 102. For example, the hearing assistance settings 160 can indicate one or more spectral processing parameters, one or more filter parameters, one or more directional audio parameters, one or more noise suppression parameters, other audio processing parameters, or combinations thereof. In this context, parameters can indicate whether particular operations are performed, how the particular operations are performed, or both. To illustrate, the noise suppression parameter(s) can indicate whether the audio processor 114 is to use noise suppression operations to process the audio data, specific types of noise suppression operations to be applied, the aggressiveness of applied noise suppression operations, or combinations thereof. As another illustrative example, the spectral processing parameters can include frequency shift parameter(s) indicating whether frequency shift operations are to be applied to one or more frequency ranges, frequency-dependent gain parameters, etc.

It can be challenging to tune a single set of hearing assistance settings of the hearing assistance device 110 in a manner that provides satisfactory hearing assistance to the user 102 in all of the situations the user 102 is likely to encounter. The system 100 of FIG. 1 solves this problem by determining hearing assistance settings 160 for the hearing assistance device 110 based on the hearing characteristics of the user 102 and based on voice characteristics of a person with which the user 102 is conversing (e.g., the target talker). The target talker can change from time-to-time, in which case the system 100 is configured to update the hearing assistance settings 160. For example, the system 100 can use a first set of hearing assistance settings when the talker 104A is speaking and designated as the target talker and can use a second set of hearing assistance settings 160 when the talker 104B is speaking and designated as the target talker. Thus, the system 100 provides the technical benefit of improving the intelligibility of speech by adapting the hearing assistance settings 160 of the hearing assistance device 110 based on the voice characteristics of a person speaking (as well as other factors, such as the hearing characteristics of the user 102 of the hearing assistance device 110).

Figure 2:
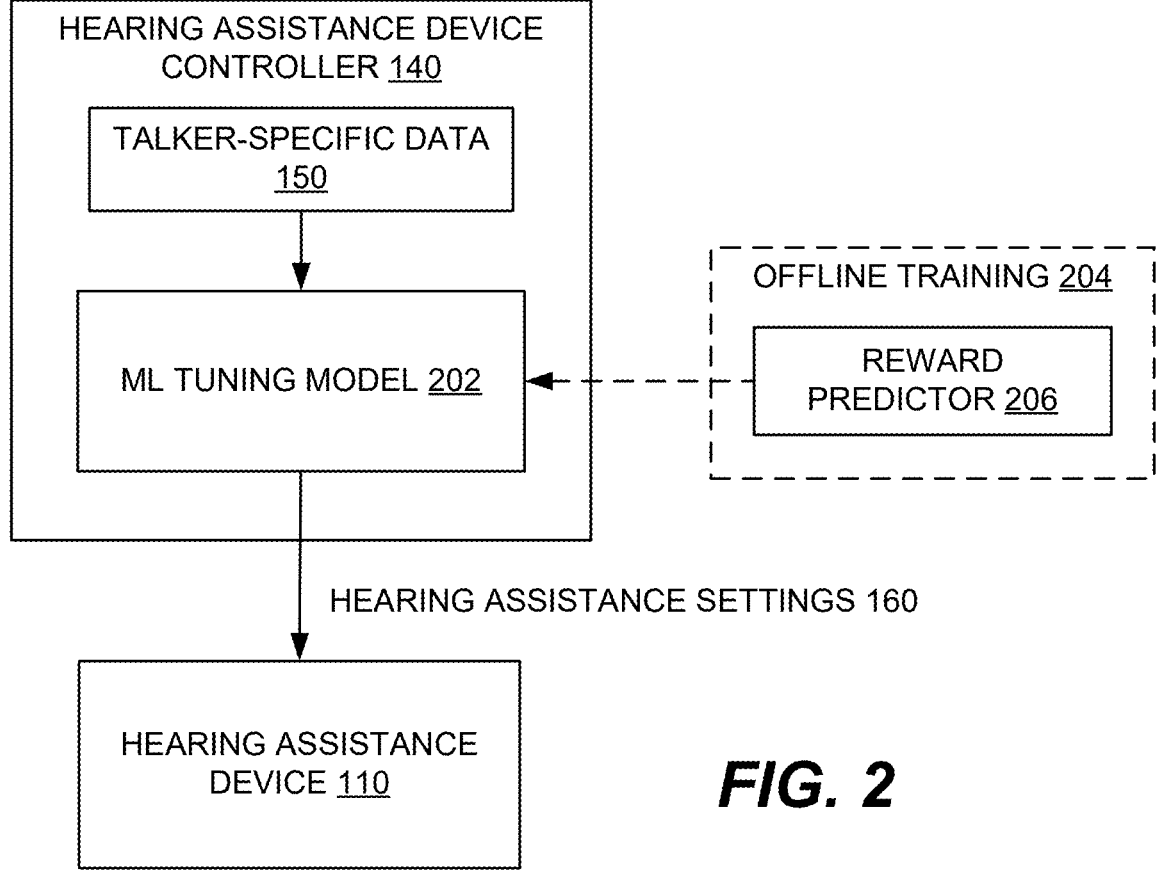
FIG. 2 is a diagram of illustrative aspects of a hearing assistance device controller of the system of FIG. 1 in accordance with some examples of the present disclosure.

FIG. 2 is a diagram of illustrative aspects of the hearing assistance device controller 140 of the system of FIG. 1 in accordance with some examples of the present disclosure. The hearing assistance device controller 140 of FIG. 2 can be included in the device 120 or the hearing assistance device 110 of FIG. 1.

The hearing assistance device controller 140 of FIG. 2 is configured to obtain the talker-specific data 150 from sensors (e.g., the sensor(s) 124 of FIG. 1), from another device (e.g., as metadata associated with the audio data 130), or via some other mechanism. In some embodiments, the talker-specific data 150 is determined based on the audio data 130 using voice recognition. As one example of the hearing assistance device controller 140 receiving the talker-specific data 150 from another device, the device 120 of FIG. 1 can receive the talker-specific data 150 from the hearing assistance device 110. In embodiments in which the hearing assistance device controller 140 is integrated within the hearing assistance device 110, the hearing assistance device 110 can receive the talker-specific data 150 from the device 120. To illustrate, the device 120 can perform voice recognition operations based on the audio data 130 and provide talker identification information or other data (e.g., data descriptive of voice characteristics of the talker) as talker-specific data 150 to the hearing assistance device 110.

In FIG. 2, the talker-specific data 150 is provided as input to an ML tuning model 202 that is configured to determine the hearing assistance settings 160 based on the talker-specific data 150. In the example illustrated in FIG. 2, offline training 204 is used to train the ML tuning model 202 to determine the hearing assistance settings 160 based on the talker-specific data 150. As a result of the offline training 204 the ML tuning model 202 automatically accounts for the hearing characteristics of the user during determination of the hearing assistance settings 160. As a particular example, the offline training 204 uses reinforcement learning based on rewards generated by a reward predictor 206. In this example, the reward predictor 206 is trained or configured using few-shot learning, such as so called "A/B" training, to account for the hearing characteristics of the user. To illustrate, the user may be presented with different sounds in a variety of contexts and including speech from different talkers. The user can be prompted to indicate a preference between several options (e.g., two options), where the options include the same sounds processed using different hearing assistance settings.

In FIG. 2, the hearing assistance device controller 140 includes the ML tuning model 202, which is configured to determine (e.g., infer) the hearing assistance settings 160 for a particular circumstance based at least in part on the talker-specific data 150. For example, in response to receiving the talker-specific data 150 (and optionally additional data), the ML tuning model 202 determines the hearing assistance settings 160 using machine-learning techniques.

Figure 3:
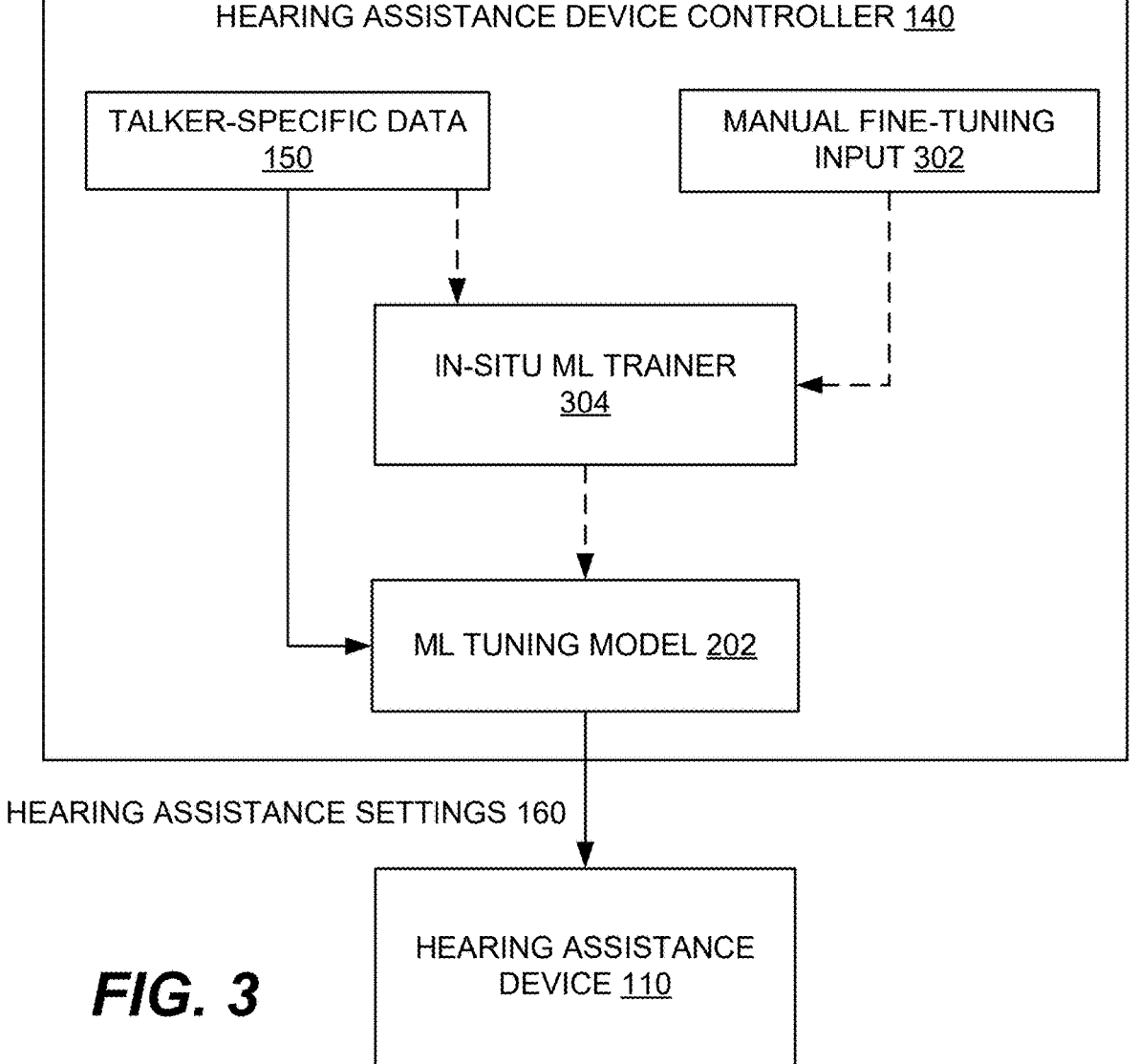
FIG. 3 is a diagram of illustrative aspects of a hearing assistance device controller of the system of FIG. 1 in accordance with some examples of the present disclosure.

FIG. 3 is a diagram of illustrative aspects of the hearing assistance device controller 140 of the system of FIG. 1 in accordance with some examples of the present disclosure. The hearing assistance device controller 140 of FIG. 3 can be included in the device 120 or the hearing assistance device 110 of FIG. 1.

Like FIG. 2, in FIG. 3, the hearing assistance settings 160 are generated by an ML tuning model 202. Initial training of the ML tuning model 202 of FIG. 3 can be performed offline as described with reference to FIG. 2 (e.g., using reinforcement learning based on rewards generated by a reward predictor 206 of FIG. 2). Additionally, in FIG. 3, the user can optionally provide manual fine-tuning input 302 to adjust the hearing assistance settings 160 in particular circumstances (e.g., when interacting with a new talker or in a new context). When the user provides the manual fine-tuning input 302, an in-situ ML trainer 304 uses the manual fine-tuning input 302 and the talker specific data 150 to fine-tune the ML tuning model 202. To illustrate, the in-situ ML trainer 304 can include the reward predictor 206 of FIG. 2, which can use reinforcement learning to change the model weights or other parameters of the ML tuning model 202 so that the ML tuning model 202 is better able to select hearing assistance settings 160 if the particular circumstances are encountered again. Thus, the hearing assistance device controller 140 of FIG. 3 can be dynamically updated, responsive to user input (e.g., the manual fine-tuning input 302) to provide better hearing assistance to the user. One technical benefit of dynamically updating the hearing assistance device controller 140 is that such updating takes into account the actual circumstances in which the user uses the hearing assistance device, rather than relying on attempts to predict appropriate sets of circumstances to generate A/B testing prompts. Thus, overtime, the ML tuning model 202 of FIG. 3 should generate more appropriate hearing assistance settings 160 for the particular user.

Figure 4:
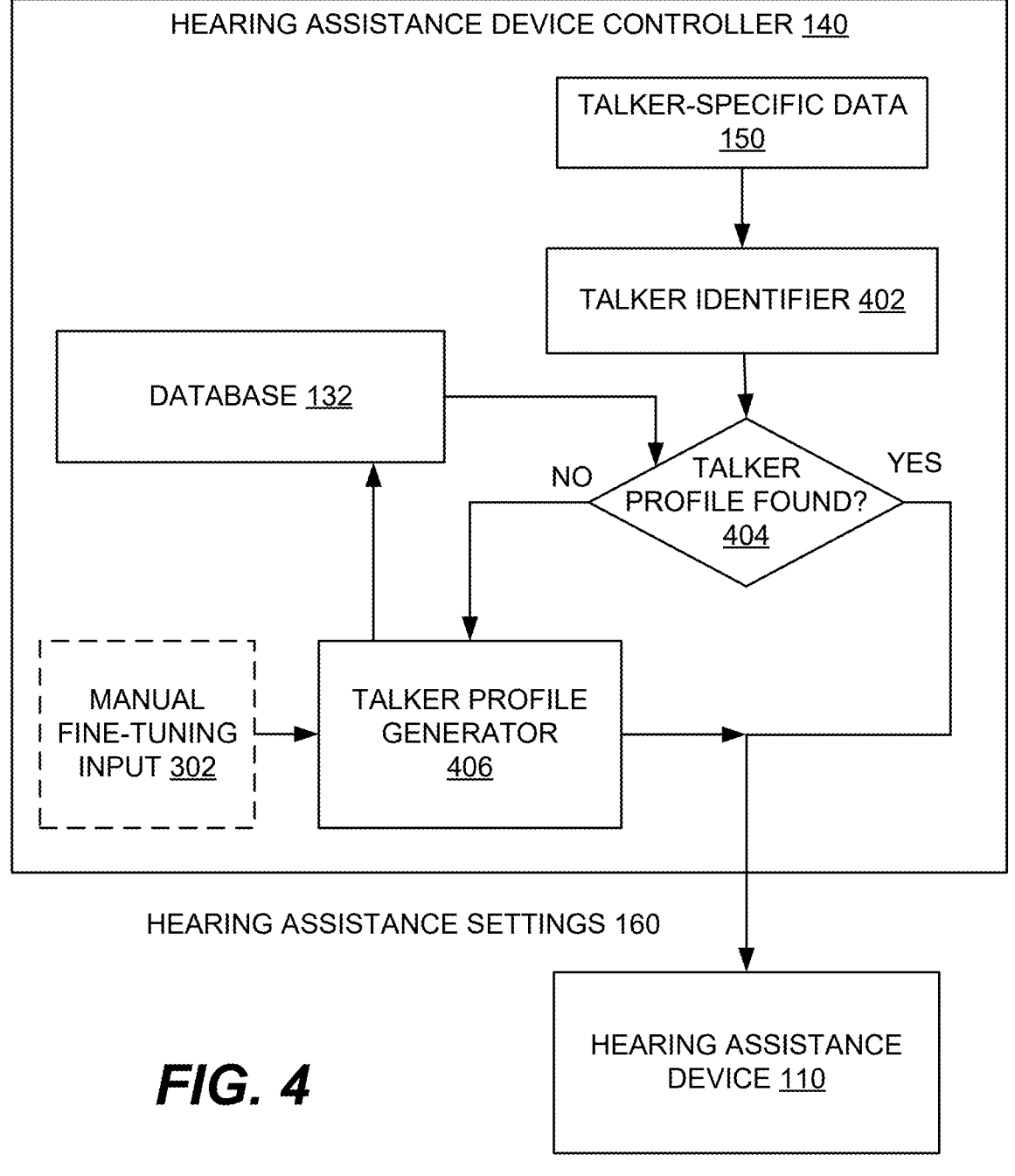
FIG. 4 is a diagram of illustrative aspects of a hearing assistance device controller of the system of FIG. 1 in accordance with some examples of the present disclosure.

FIG. 4 is a diagram of illustrative aspects of the hearing assistance device controller 140 of the system 100 of FIG. 1 in accordance with some examples of the present disclosure. The hearing assistance device controller 140 of FIG. 4 can be included in the device 120 or the hearing assistance device 110 of FIG. 1.

The hearing assistance device controller 140 of FIG. 4 is configured to obtain the talker-specific data 150 from sensors (e.g., the sensor(s) 124 of FIG. 1), from another device (e.g., as metadata associated with the audio data 130), or via some other mechanism. In some embodiments, the talker-specific data 150 is determined based on the audio data 130 using voice recognition. As one example of the hearing assistance device controller 140 receiving the talker-specific data 150 from another device, the device 120 of FIG. 1 can receive the talker-specific data 150 from the hearing assistance device 110. In embodiments in which the hearing assistance device controller 140 is integrated within the hearing assistance device 110, the hearing assistance device 110 can receive the talker-specific data 150 from the device 120. To illustrate, the device 120 can perform voice recognition operations based on the audio data 130 and provide talker identification information or other data (e.g., data descriptive of voice characteristics of the talker) as talker-specific data 150 to the hearing assistance device 110.

In FIG. 4, the talker-specific data 150 is provided to a talker identifier 402 to determine talker identification data. The talker identification data can include, for example, a talker name, a description of the talker (e.g., in terms of voice characteristics or talker characteristics that are generally related to voice characteristics, such as age), a talker unique identifier, etc. As one example, the talker identifier 402 includes one or more embedding networks, and the talker identification data includes a talker embedding. In another example, the talker identifier 402 includes a voice recognition model that is configured to compare voice characteristics of speech detected in the audio data 130 to one or more voice characteristics associated with enrolled talkers. In this example, a talker can be enrolled based on input from the user 102 of FIG. 1. To illustrate, the user 102 can optionally provide the manual fine-tuning input 302 to modify the hearing assistance settings 160 while listening to the speech 106A of the talker 104A of FIG. 1. In this illustrative example, voice characteristics determined by the talker identifier 402 based on the speech 106A of the talker 104A can be stored in the database 132 to enroll the talker 104A. When a new talker is enrolled, the user 102 can be prompted to provide descriptors associated with the talker, such as a name; however, such descriptors are optional and are not needed for the talker identifier 402 to distinguish among talkers. In a particular aspect, the manual fine-tuning input 302 can indicate user-specified hearing assistance settings, which can be provided to the hearing assistance device 110 as the hearing assistance settings 160.

In FIG. 4, the talker identification information generated by the talker identifier 402 is used to search the database 132. As in FIG. 1, the database 132 includes talker profiles 134 mapped to corresponding hearing assistance settings 136. Each talker profile 134 includes talker identification information as generated by the talker identifier 402. At decision block 404, the hearing assistance device controller 140 determines whether a talker profile corresponding to the talker identification information from the talker identifier 402 is found in the database 132. If a talker profile is found, the hearing assistance settings 136 associated with the talker profile 134 in the database 132 are used as the hearing assistance settings 160 provided to the hearing assistance device 110. If no talker profile is found, updated hearing assistance settings 160 are not provided to the hearing assistance device 110 (or default hearing assistance settings are provided to the hearing assistance device 110) unless the user provides manual fine-tuning input 302. If the user provides the manual fine-tuning input 302, the hearing assistance device 110 is provided hearing assistance settings 160 based on the manual fine-tuning input 302 (e.g., the hearing assistance settings 160 are user-specified hearing assistance settings), and optionally, the talker profile generator 406 can update the database 132 to include the hearing assistance settings 160 based on the manual fine-tuning input 302 and a talker profile based on the talker identification information.

In some embodiments, the hearing assistance device controller 140 causes a prompt to be presented to the user when no talker profile corresponding to the talker identification information is found in the database 132. In such embodiments, the talker profile generator 406 generates a talker profile (or updates an existing talker profile) based on the user's response to the prompt.

Figure 5:
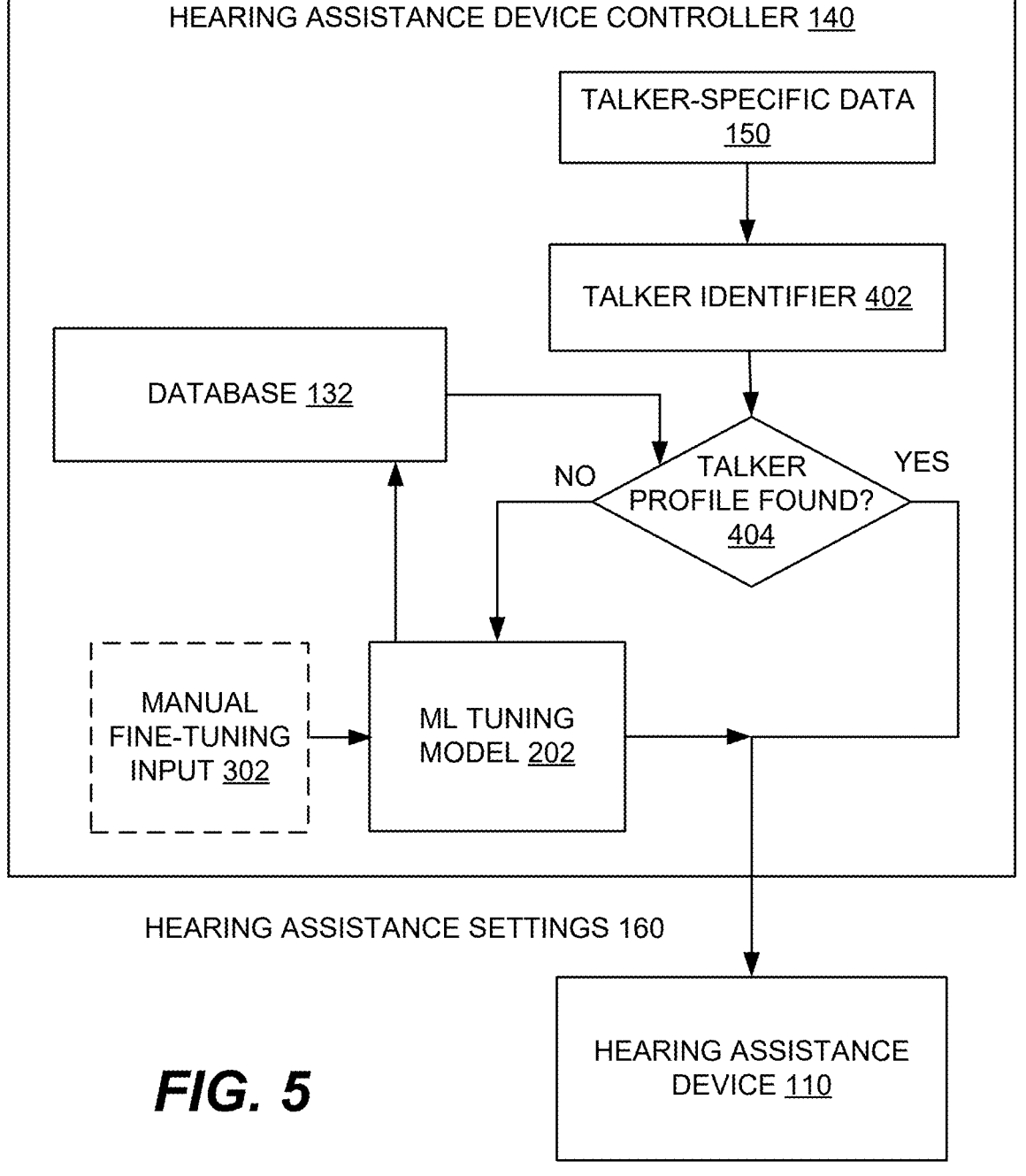
FIG. 5 is a diagram of illustrative aspects of a hearing assistance device controller of the system of FIG. 1 in accordance with some examples of the present disclosure.

FIG. 5 is a diagram of illustrative aspects of a hearing assistance device controller of the system of FIG. 1 in accordance with some examples of the present disclosure. The hearing assistance device controller 140 of FIG. 2 can be included in the device 120 or the hearing assistance device 110 of FIG. 1.

The example illustrated in FIG. 5 is similar to the example illustrated in FIG. 4 except that the ML tuning model 202 is used to generate the hearing assistance settings 160 when no talker profile corresponding to the talker identification information is found in the database 132 at decision block 404.

To illustrate, in FIG. 5, the hearing assistance device controller 140 is configured to obtain the talker-specific data 150 and to provide the talker-specific data 150 to the talker identifier 402 to determine the talker identification data. The hearing assistance device controller 140 determines whether a talker profile associated with the talker identification data is available at the database 132. If a talker profile for the talker is available, the hearing assistance settings 160 corresponding to the talker profile are used to configure the hearing assistance device 110. If no talker profile is found, the ML tuning model 202 generates the hearing assistance settings 160. Optionally, the ML tuning model 202 can also store the hearing assistance settings 160 in the database 132 along with the talker identification data to generate a new talker profile.

The ML tuning model 202 of FIG. 5 can be trained offline, as described with reference to FIG. 2. Optionally, in some embodiments, the ML tuning model 202 of FIG. 5 can be updated or further trained based on the manual fine-tuning input 302, as described with reference to FIG. 3.

Figure 6:
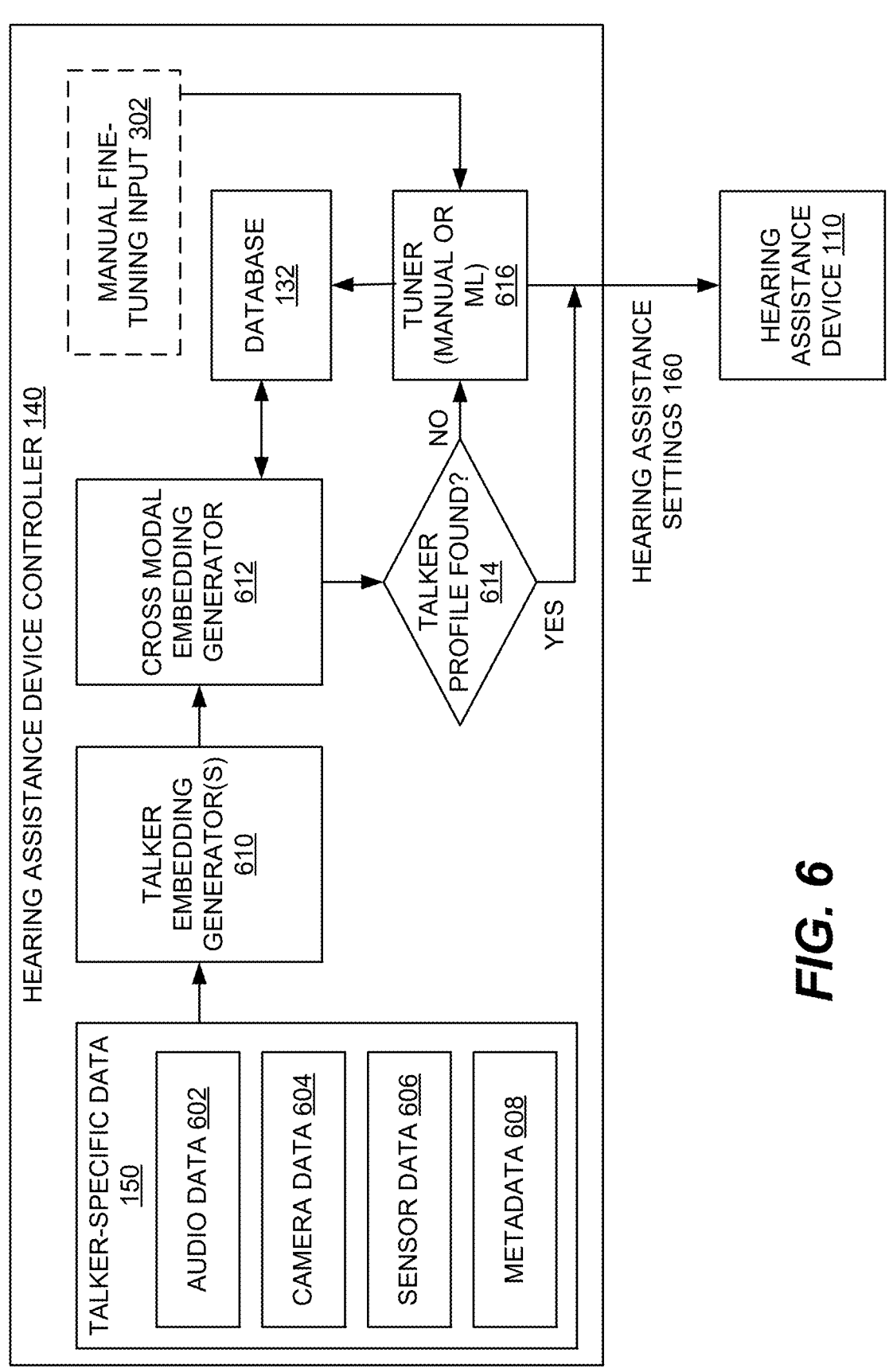
FIG. 6 is a diagram of illustrative aspects of a hearing assistance device controller of the system of FIG. 1 in accordance with some examples of the present disclosure.

FIG. 6 is a diagram of illustrative aspects of a hearing assistance device controller of the system of FIG. 1 in accordance with some examples of the present disclosure. The hearing assistance device controller 140 of FIG. 6 can be included in the device 120 or the hearing assistance device 110 of FIG. 1.

In the example illustrated in FIG. 6, the talker-specific data 150 can optionally include multi-modal data, such as, but not limited to, audio data 602 (e.g., voice data of the talker), camera data 604 (e.g., a video or image depicting the talker, a video or image depicting a context around the user, etc.), sensor data 606 (e.g., location data), and/or metadata 608 (e.g., caller ID data associated with a communication session, active speaker ID data associated with a communication session, voice ID data, face ID data, etc.), as illustrative examples.

The talker-specific data 150 is provided to one or more talker embedding generators 610. For example, if the talker-specific data 150 is multi-modal, the talker embedding generator(s) 610 can include one embedding generator for each different type of the talker-specific data 150. To illustrate, the talker embedding generator(s) 610 can include an embedding generator for the audio data 130, an embedding generator for the camera data 604, an embedding generator for the sensor data 606, and an embedding generator for the metadata 608. The talker embedding generator(s) 610 can include more or fewer embedding generators depending on the specific types of talker-specific data 150 used in a particular embodiment.

Each of the talker embedding generator(s) 610 can include an embedding network configured to generate an embedding vector based on input data from the talker-specific data 150. If the talker-specific data 150 is multi-modal and more than one talker embedding generator 610 is used, the hearing assistance device controller 140 can optionally include a cross-modal embedding generator 612 to generate a single talker embedding (e.g., a single target talker embedding) that combines all of, or portions of, the embedding vectors representing the multi-modal talker-specific data 150.

At decision block 614, the hearing assistance device controller 140 compares the target talker embedding to reference embeddings in the database 132, where each reference embedding corresponds to one of the talker profiles 134 of FIG. 1. The comparison includes determining distances, in an embedding space, between the target talker embedding and one or more of the reference embeddings. A reference embedding is considered to match the target talker embedding if the distance between the target talker embedding and the reference embedding is less than a threshold distance. If a reference embedding that matches the target talker embedding is found in the database 132, the hearing assistance settings 160 associated with the reference embedding are used to configure the hearing assistance device 110.

If no reference embedding that matches the target talker embedding is found in the database 132, the hearing assistance settings 160 used by the hearing assistance device 110 can remain unchanged. Alternatively, a tuner 616 can cause the user to be prompted to provide manual fine-tuning input 302, and the user-specified hearing assistance settings received in response to the prompt can be provided as the hearing assistance settings 160 to the hearing assistance device 110. As another alternative, the tuner 616 can include an ML tuning model (e.g., the ML tuning model 202 of any of FIG. 2, 3 or 5), which can generate the hearing assistance settings 160 (with or without the manual fine-tuning input 302). Whether the tuner 616 determines the hearing assistance settings 160 manually (e.g., based on the manual fine-tuning input 302) or using machine-learning techniques, the hearing assistance settings 160 so generated can be stored, along with the target talker embedding, as a new talker profile in the database 132.

Each of the examples described with reference to FIGS. 2-6 enables talker-specific tuning of the hearing assistance device 110. The talker-specific tuning can be performed in real-time. To illustrate, during a conversation among the user of the hearing assistance device, a first target talker, and a second target talker, the hearing assistance settings 160 can be adjusted each time the active speaker switches between the first target talker and the second target talker. The conversation can be face-to-face or via a communication link, such as an audio call or a videoconference. Further, the user of the hearing assistance device 110 need not be a participant in the conversation. For example, the first and second target talkers can include actors in a movie or play that the user of the hearing assistance device 110 is observing. In any of these examples, automatically adjusting the hearing assistance settings 160 based on who is talking can improve the user's ability to understand the talker's speech.

Figure 7:
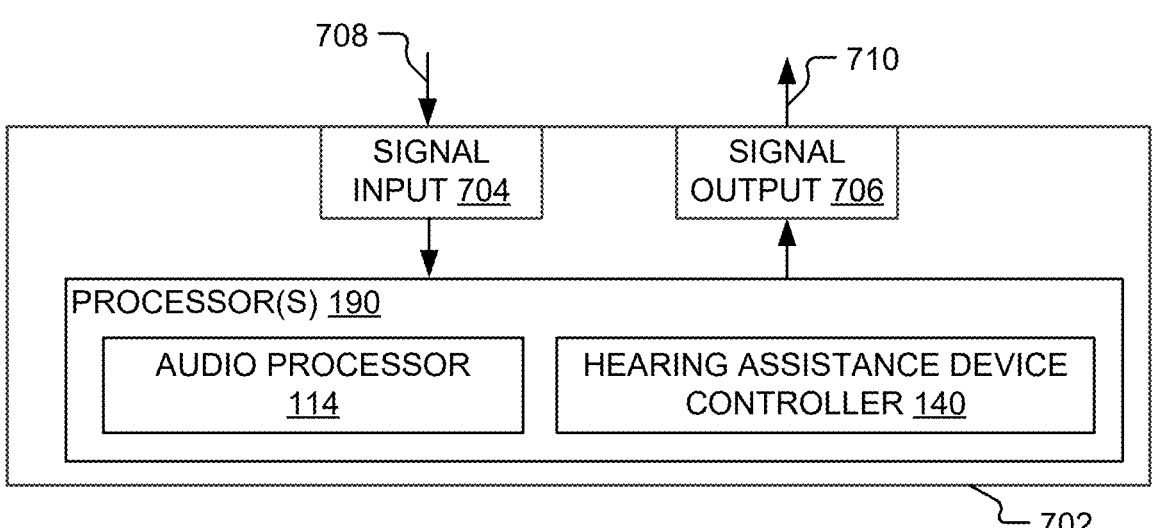
FIG. 7 illustrates an example of an integrated circuit operable to adjust hearing assistance settings of a hearing assistance device in accordance with some examples of the present disclosure.
Figure 10:
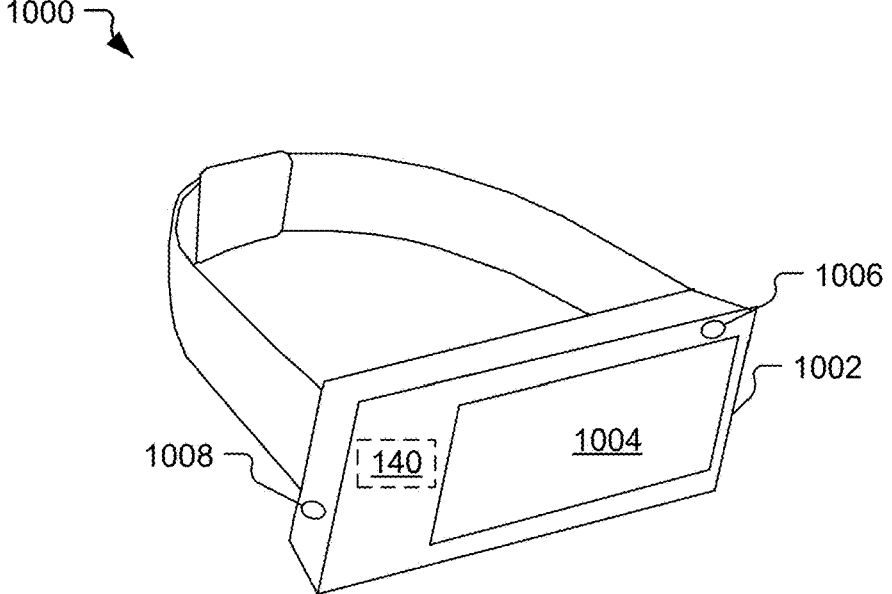
FIG. 10 is a diagram of a wearable electronic device that incorporates aspects of the system of FIG. 1 in accordance with some examples of the present disclosure.
Figure 11:
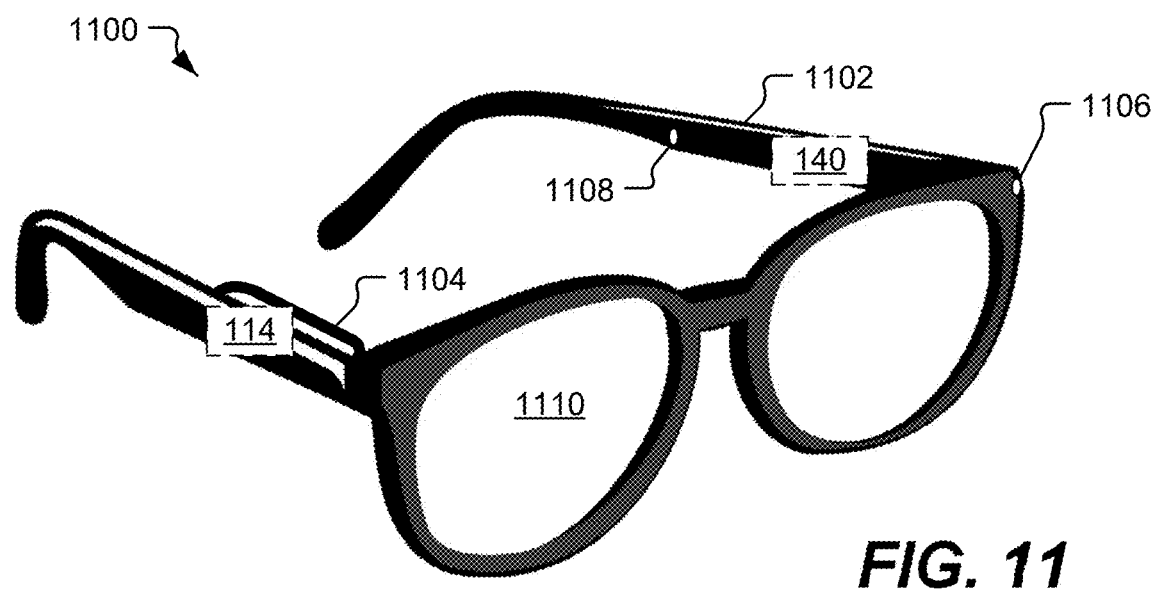
FIG. 11 is a diagram of a mixed reality or augmented reality glasses device that incorporates aspects of the system of FIG. 1 in accordance with some examples of the present disclosure.
Figure 12:
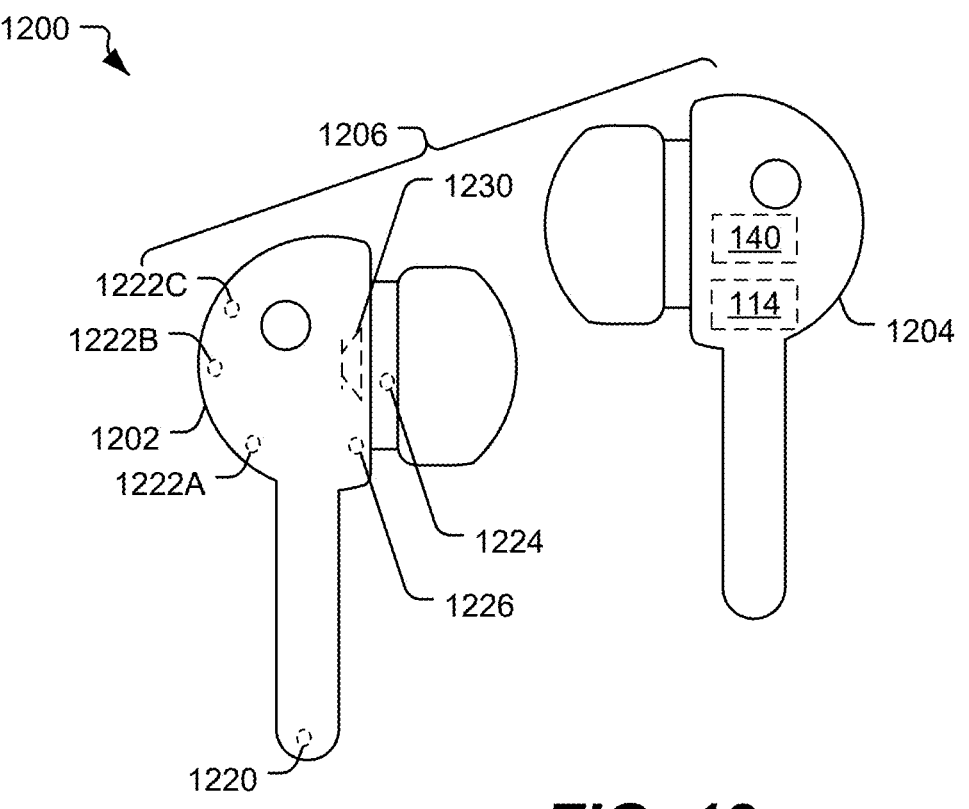
FIG. 12 is a diagram of earbuds that incorporate aspects of the system of FIG. 1 in accordance with some examples of the present disclosure.
Figure 13:
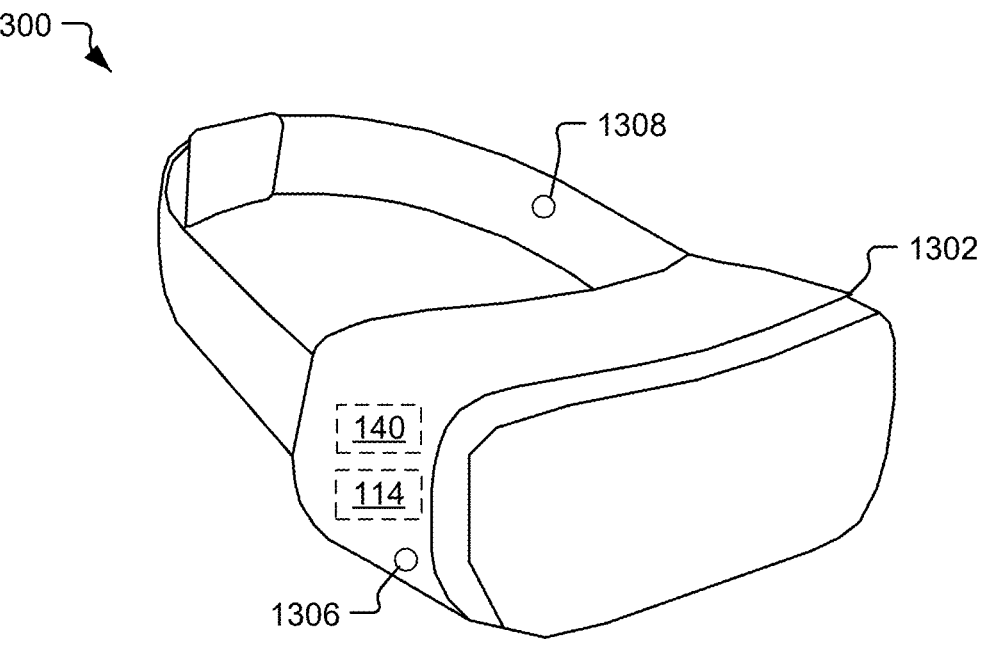
FIG. 13 is a diagram of a headset, such as a virtual reality, mixed reality, or augmented reality headset that incorporates aspects of the system of FIG. 1 in accordance with some examples of the present disclosure.
Figure 14:
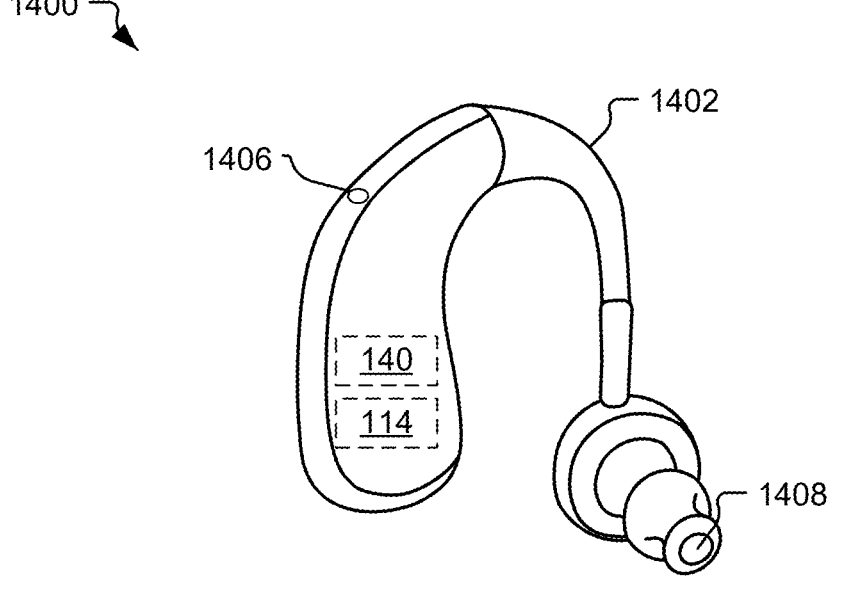
FIG. 14 is a diagram of a hearing assistance device that incorporates aspects of the system of FIG. 1 in accordance with some examples of the present disclosure.

FIG. 7 depicts an implementation 700 of aspects of the device 110, the device 120, or both, as an integrated circuit 702 that includes the processor(s) 190. The integrated circuit 702 includes a signal input 704, such as one or more bus interfaces, to receive input data 708, such as the audio data 130, the talker-specific data 150, other data used to determine the hearing assistance settings 160 of FIG. 1, or combinations thereof. The integrated circuit 702 also includes a signal output 706, such as a bus interface, to enable sending of output data 710, such as the hearing assistance settings 160, the audio data 130 processed based on the hearing assistance settings 160, etc. The integrated circuit 702 enables implementation of adjusting hearing assistance settings based on voice characteristics of a talker and hearing characteristics of a user of a hearing assistance device as a component in a device, such as a mobile phone or tablet as depicted in FIG. 8, a headset as depicted in FIG. 9, a wearable electronic device as depicted in FIG. 10, augmented reality or mixed reality glasses as depicted in FIG. 11, earbuds as depicted in FIG. 12, a virtual reality, mixed reality, or augmented reality headset as depicted in FIG. 13, a hearing assistance device as depicted in FIG. 14.

Figure 8:
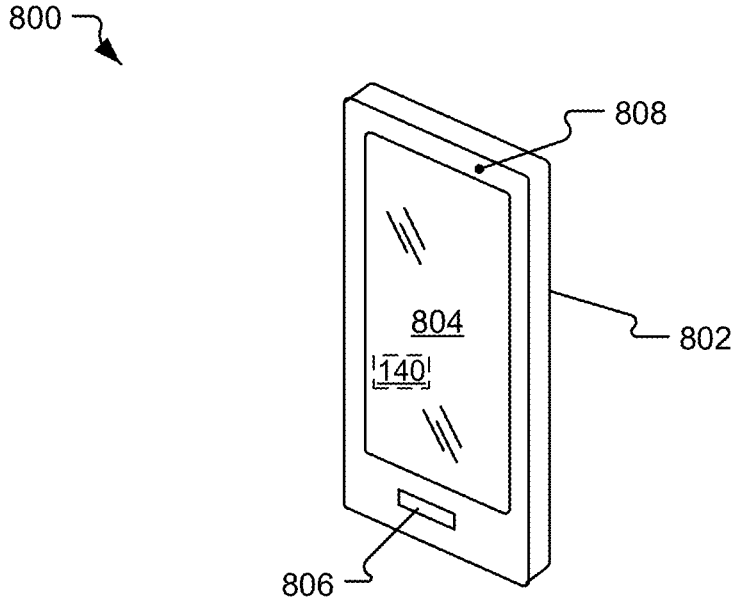
FIG. 8 is a diagram of a mobile device that incorporates aspects of the system of FIG. 1 in accordance with some examples of the present disclosure.

FIG. 8 depicts an implementation 800 in which aspects of the device 110 include a mobile device 802, such as a phone or tablet, as illustrative, non-limiting examples. In the example illustrated in FIG. 8, the mobile device 802 includes one or more microphones 806, one or more speakers 808, and a display screen 804. Components of the processor(s) 190, including the hearing assistance device controller 140, are integrated in the mobile device 802 and are illustrated using dashed lines to indicate internal components that are not generally visible to a user of the mobile device 802.

In the example of FIG. 8, the mobile device 802 is configured to communicate with a hearing assistance device, such as the hearing assistance device 110 of FIG. 1. For example, the mobile device 802 can obtain talker-specific data (e.g., the talker-specific data 150) related to audio data for playout to a user of the hearing assistance device. The mobile device 802 can determine hearing assistance settings based on voice characteristics of a target talker associated with the audio data and based on hearing characteristics of the user and provide the hearing assistance settings to the hearing assistance device. The mobile device 802 can also be configured to provide, at the display screen 804, a GUI that includes controls for the hearing assistance device. For example, the user can provide user input to control operation of the hearing assistance device via the GUI.

Figure 9:
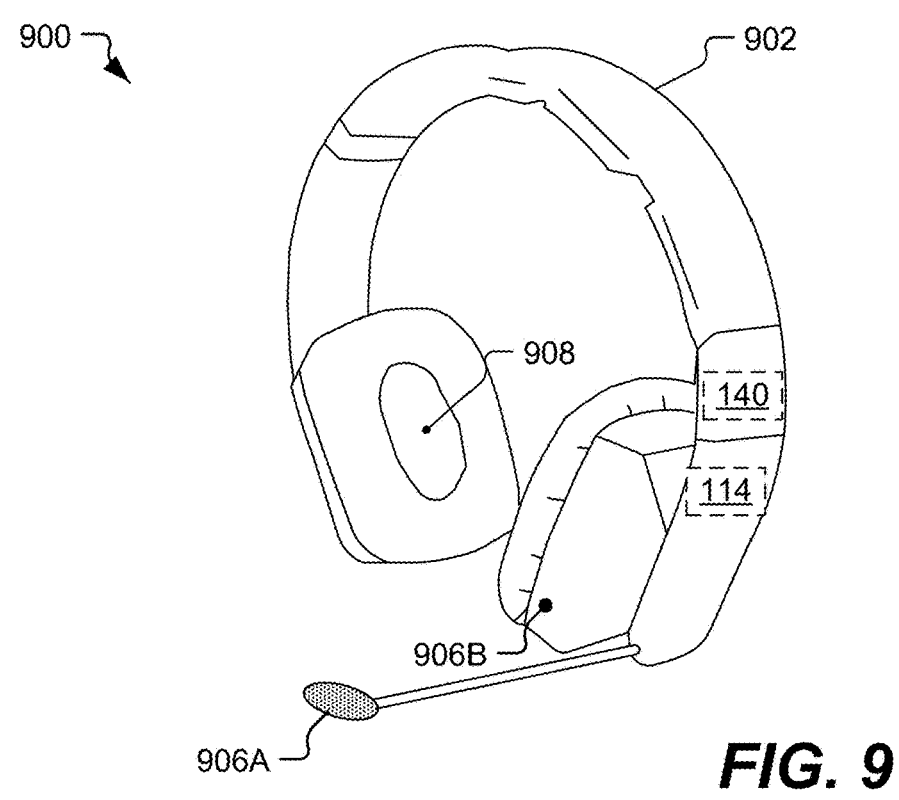
FIG. 9 is a diagram of a headset that incorporates aspects of the system of FIG. 1 in accordance with some examples of the present disclosure.

FIG. 9 depicts an implementation 900 in which the device 110, the device 120, or both, are integrated within a headset device 902. The headset device 902 includes one or more microphone(s) 906 (including a microphone 906A and a microphone 906B) and one or more speakers 908. In the example illustrated, the microphone 906A is positioned primarily to capture speech of the user, and the microphone 906B is positioned to capture ambient sounds, such as the sound 108 of FIG. 1. In FIG. 9, the headset device 902 includes the hearing assistance device controller 140, the audio processor 114, or both.

In embodiments in which the headset device 902 includes the audio processor 114, the headset device 902 is configured to process audio data captured at the microphone(s) 906 and to provide processed audio output, via the speaker(s) 908, to the user. For example, the headset device 902 can process the audio data using hearing assistance settings that are based on voice characteristics of a target talker associated with the audio data and based on hearing characteristics of a user of the headset device 902. The hearing assistance settings can be determined by the hearing assistance device controller 140, which can be onboard the headset device 902 or onboard a remote device.

In embodiments in which the headset device 902 includes the hearing assistance device controller 140, the headset device 902 is configured to obtain talker-specific data (e.g., the talker-specific data 150) related to the audio data and obtain hearing assistance settings based on voice characteristics of a target talker associated with the audio data and based on hearing characteristics of the user and provide the hearing assistance settings to the hearing assistance device. For example, in such embodiments, the hearing assistance device controller 140 of the headset device 902 can retrieve or determine the hearing assistance settings 160 and provide the hearing assistance settings 160 to the audio processor 114.

FIG. 10 depicts an implementation 1000 in which the device 120 includes a wearable electronic device 1002, illustrated as a "smart watch." The hearing assistance device controller 140, a display screen 1004, one or more microphones 1006, and one or more speakers 1008 are integrated into the wearable electronic device 1002. Components of the processor(s) 190, including the hearing assistance device controller 140, are integrated in the wearable electronic device 1002.

In the example of FIG. 10, the wearable electronic device 1002 is configured to communicate with a hearing assistance device, such as the hearing assistance device 110 of FIG. 1. For example, the wearable electronic device 1002 can obtain talker-specific data (e.g., the talker-specific data 150) related to audio data for playout to a user of the hearing assistance device. The wearable electronic device 1002 can determine hearing assistance settings based on voice characteristics of a target talker associated with the audio data and based on hearing characteristics of the user and provide the hearing assistance settings to the hearing assistance device. The wearable electronic device 1002 can also be configured to provide, at the display screen 1004, a GUI that includes controls for the hearing assistance device. For example, the user can provide user input to control operation of the hearing assistance device via the GUI.

In a particular example, the wearable electronic device 1002 also includes a haptic device that provides a haptic notification (e.g., vibrates). For example, the haptic notification can cause a user to look at the wearable electronic device 1002 to see a displayed notification indicating detection of speech of an unrecognized talker and prompt the user to indicate whether a talker profile should be generated for the unrecognized talker.

FIG. 11 depicts an implementation 1100 in which the device 110, the device 120, or both, are integrated within augmented reality or mixed reality glasses 1102. The glasses 1102 include a holographic projection unit 1104 configured to project visual data onto a surface of a lens 1110 or to reflect the visual data off of a surface of the lens 1110 and onto the wearer's retina. The glasses 1102 also includes one or more microphones 1106, one or more speakers 1108, or both. The glasses 1102 include the hearing assistance device controller 140, the audio processor 114, or both.

In embodiments in which the glasses 1102 include the audio processor 114, the glasses 1102 are configured to process audio data captured at the microphone(s) 1106 and to provide processed audio output, via the speaker(s) 1108, to the user. For example, the glasses 1102 can process the audio data using hearing assistance settings that are based on voice characteristics of a target talker associated with the audio data and based on hearing characteristics of a user of the glasses 1102. The hearing assistance settings can be determined by the hearing assistance device controller 140, which can be onboard the glasses 1102 or onboard a remote device.

In embodiments in which the glasses 1102 include the hearing assistance device controller 140, the glasses 1102 are configured to obtain talker-specific data (e.g., the talker-specific data 150) related to the audio data and obtain hearing assistance settings based on voice characteristics of a target talker associated with the audio data and based on hearing characteristics of the user and provide the hearing assistance settings to the hearing assistance device. For example, in such embodiments, the hearing assistance device controller 140 of the glasses 1102 can retrieve or determine the hearing assistance settings 160 and provide the hearing assistance settings 160 to the audio processor 114. In a particular example, the holographic projection unit 1104 is configured to display a notification indicating detection of speech of an unrecognized talker and prompt the user to indicate whether a talker profile should be generated for the unrecognized talker.

FIG. 12 depicts an implementation 1200 in which the device 110, the device 120, or both, are integrated within a pair of earbuds 1206 that includes a first earbud 1202 and a second earbud 1204. Although earbuds are described, it should be understood that the present technology can be applied to other in-ear or over-ear playback devices.

The first earbud 1202 includes a first microphone 1220, such as a high signal-to-noise microphone positioned to capture the voice of a wearer of the first earbud 1202, an array of one or more other microphones configured to detect ambient sounds and spatially distributed to support beamforming, illustrated as microphones 1222A, 1222B, and 1222C, an "inner" microphone 1224 proximate to the wearer's ear canal (e.g., to assist with active noise cancelling), and a self-speech microphone 1226, such as a bone conduction microphone configured to convert sound vibrations of the wearer's ear bone or skull into an audio signal. The second earbud 1204 can be configured in a substantially similar manner to the first earbud 1202.

In particular embodiments, the earbuds 1206 include the audio processor 114. In such embodiments, the first microphone 1220, the microphones 1222A, 1222B, and 1222C, or a combination thereof, are configured to generate the audio data 130 of FIG. 1. In such embodiments, the audio data is provided to the audio processor 114, and the audio processor 114 processes the audio data based on the hearing assistance settings 160 to generate processed audio output. The processed audio data is provided as output audio, via the speaker(s) 1108, to the user. For example, the earbuds 1206 can process the audio data using hearing assistance settings that are based on voice characteristics of a target talker associated with the audio data and based on hearing characteristics of a user of the earbuds 1206. The hearing assistance settings can be determined by the hearing assistance device controller 140, which can be onboard the earbuds 1206 or onboard a remote device.

In embodiments in which the earbuds 1206 include the hearing assistance device controller 140, the earbuds 1206 are configured to obtain talker-specific data (e.g., the talker-specific data 150) related to the audio data and obtain hearing assistance settings based on voice characteristics of a target talker associated with the audio data and based on hearing characteristics of the user and provide the hearing assistance settings to the hearing assistance device. For example, in such embodiments, the hearing assistance device controller 140 of the earbuds 1206 can retrieve or determine the hearing assistance settings 160 and provide the hearing assistance settings 160 to the audio processor 114.

In some embodiments, the audio processor 114, the hearing assistance device controller 140, or both, of the first earbud 1202 is also configured to receive one or more audio signals generated by one or more microphones of the second earbud 1204, such as via wireless transmission between the earbuds 1202, 1204, or via wired transmission in implementations in which the earbuds 1202, 1204 are coupled via a transmission line. Further, in some embodiments, the earbuds 1202, 1204 are configured to automatically switch between various operating modes, such as a passthrough mode in which ambient sound is played via the speaker(s) 1230, a playback mode in which non-ambient sound (e.g., streaming audio corresponding to a phone conversation, media playback, video game, etc.) is played back through the speaker(s) 1230, and a hearing assistance mode in which audio data is processed based on the hearing assistance settings. In other implementations, the earbuds 1202, 1204 may support fewer modes or may support one or more other modes in place of, or in addition to, the described modes.

In some examples, the earbuds 1202, 1204 can operate in two or more of the modes concurrently, such as by performing audio zoom on a particular ambient sound (e.g., a dog barking) and playing out the audio zoomed sound superimposed on the sound being played out while the wearer is listening to music (which can be reduced in volume while the audio zoomed sound is being played). In this example, the wearer can be alerted to the ambient sound associated with the audio event without halting playback of the music.

FIG. 13 depicts an implementation 1300 in which the device 110, the device 120, or both, are integrated within a portable electronic device that corresponds to a virtual reality, mixed reality, or augmented reality headset 1302. The headset 1302 includes one or more microphones 1306, one or more speakers 1308, or both. The headset 1302 also includes a visual interface device positioned in front of the user's eyes to enable display of augmented reality, mixed reality, or virtual reality images or scenes to the user while the headset 1302 is worn. In FIG. 13, the headset 1302 includes the hearing assistance device controller 140, the audio processor 114, or both.

In embodiments in which the headset 1302 includes the audio processor 114, the headset 1302 is configured to process audio data captured at the microphone(s) 1306 and to provide processed audio output, via the speaker(s) 1308, to the user. For example, the headset 1302 can process the audio data using hearing assistance settings that are based on voice characteristics of a target talker associated with the audio data and based on hearing characteristics of a user of the headset 1302. The hearing assistance settings can be determined by the hearing assistance device controller 140, which can be onboard the headset 1302 or onboard a remote device.

In embodiments in which the headset 1302 includes the hearing assistance device controller 140, the headset 1302 is configured to obtain talker-specific data (e.g., the talker-specific data 150) related to the audio data and obtain hearing assistance settings based on voice characteristics of a target talker associated with the audio data and based on hearing characteristics of the user and provide the hearing assistance settings to the hearing assistance device. For example, in such embodiments, the hearing assistance device controller 140 of the headset 1302 can retrieve or determine the hearing assistance settings 160 and provide the hearing assistance settings 160 to the audio processor 114. In a particular example, the visual interface device of the headset 1302 is configured to display a notification indicating detection of speech of an unrecognized talker and prompt the user to indicate whether a talker profile should be generated for the unrecognized talker.

FIG. 14 depicts an implementation 1400 in which the device 110, the device 120, or both, are integrated within a hearing assistance device 1402. In FIG. 14, the hearing assistance device 1402 includes one or more microphones 1406 and one or more speakers 1408. The hearing assistance device 1402 includes the audio processor 114, and optionally also includes the hearing assistance device controller 140.

The hearing assistance device 1402 is configured to process audio data captured at the microphone(s) 1406 and to provide processed audio output, via the speaker(s) 1408, to the user. For example, the hearing assistance device 1402 can process the audio data using hearing assistance settings that are based on voice characteristics of a target talker associated with the audio data and based on hearing characteristics of a user of the hearing assistance device 1402. The hearing assistance settings can be determined by the hearing assistance device controller 140, which can be onboard the hearing assistance device 1402 or onboard a remote device.

In embodiments in which the hearing assistance device 1402 includes the hearing assistance device controller 140, the hearing assistance device 1402 is configured to obtain talker-specific data (e.g., the talker-specific data 150) related to the audio data and obtain hearing assistance settings based on voice characteristics of a target talker associated with the audio data and based on hearing characteristics of the user and provide the hearing assistance settings to the hearing assistance device. For example, in such embodiments, the hearing assistance device controller 140 of the hearing assistance device 1402 can retrieve or determine the hearing assistance settings 160 and provide the hearing assistance settings 160 to the audio processor 114.

Figure 15:
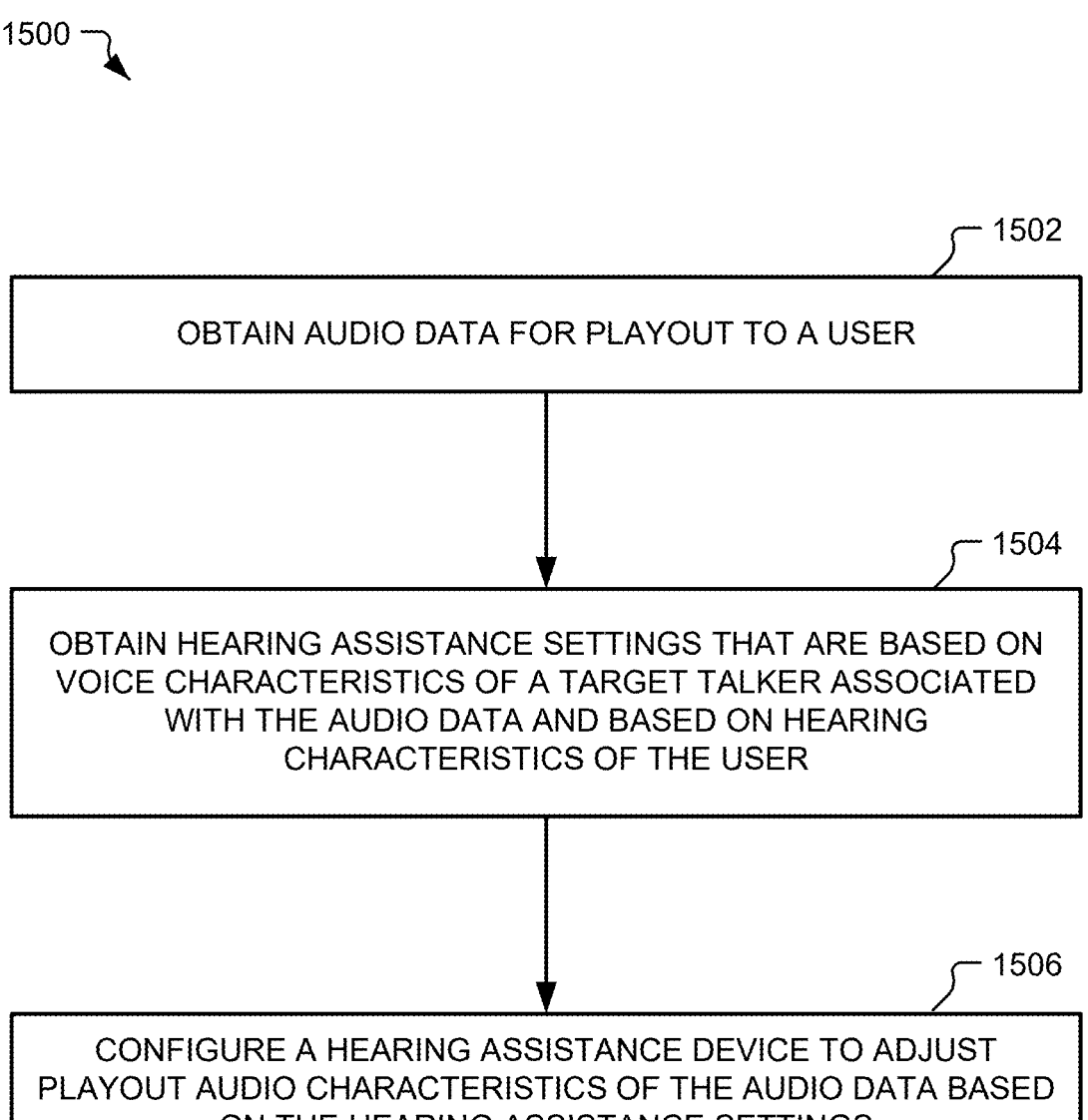
FIG. 15 is a diagram of a particular implementation of a method of adjusting hearing assistance settings of a hearing assistance device that may be performed by the system of FIG. 1 in accordance with some examples of the present disclosure.

Referring to FIG. 15, a particular implementation of a method 1500 of talker-specific tuning of a hearing assistance device is shown. In a particular aspect, one or more operations of the method 1500 are performed by at least one of the hearing assistance device controller 140, the processor(s) 190, the device 120, the hearing assistance device 110, the system 100 of FIG. 1, or a combination thereof.

The method 1500 includes, at block 1502, obtaining audio data for playout to a user. For example, the microphone(s) 112 of the hearing assistance device 110 of FIG. 1 can capture the audio data 130.

The method 1500 includes, at block 1504, obtaining hearing assistance settings that are based on voice characteristics of a target talker associated with the audio data and based on hearing characteristics of the user. For example, the hearing assistance settings can indicate one or more spectral processing parameters, one or more filter parameters, one or more directional audio parameters, one or more noise suppression parameters, or a combination thereof. For example, the hearing assistance device controller 140 can obtain the hearing assistance settings 136. In some examples, the hearing assistance settings 136 are obtained by retrieving the hearing assistance settings from a database that includes a variety of hearing assistance settings associated with talker profiles. In other examples, the hearing assistance settings 136 can be determined using one or more ML models.

The method 1500 includes, at block 1506, configuring a hearing assistance device to adjust playout audio characteristics of the audio data based on the hearing assistance settings. For example, the hearing assistance device controller 140 can cause the audio processor 114 of the hearing assistance device 110 to use particular hearing assistance settings 160 based on the voice characteristics of the target talker and hearing characteristics of the user of the hearing assistance device 110.

In some embodiments, the method 1500 includes obtaining talker-specific data associated with the audio data and determining, based on the talker-specific data, whether a talker profile for the target talker is available in a database that maps talker profiles to corresponding hearing assistance settings. In some such embodiments, the hearing assistance settings identified in the database include user-specified hearing assistance settings. The talker-specific data can include, for example, audio features extracted from the audio data, one or more images captured concurrently with capture of the audio data, sensor data captured concurrently with capture of the audio data, metadata associated with the audio data, or a combination thereof. To illustrate, the metadata associated with the audio data can include caller identification data associated with a communication session, an active speaker identifier associated with a communication session, or both.

In some embodiments, the method 1500 includes, based on a determination that no talker profile for the target talker is available, updating the database based on the talker-specific data for the target talker to generate a new talker profile associated with the target talker.

In some embodiments, the method 1500 includes, based on a determination that the talker profile for the target talker is available, using the corresponding hearing assistance settings to configure the hearing assistance device.

In some embodiments, the method 1500 includes determining a target talker embedding based on the talker-specific data and selecting as the talker profile a reference talker profile from among a plurality of reference talker profiles. In such embodiments, the reference talker profile is selected based on a distance in embedding space between the target talker embedding and a reference talker embedding associated with the reference talker profile. Alternatively, based on a determination that no reference talker embedding is within a threshold distance of the target talker embedding in an embedding space, the method 1500 can include generating a reference talker profile corresponding to the talker profile, determining the hearing assistance settings based on a machine-learning model (which may be trained based on the hearing characteristic of the user), and associating the hearing assistance settings with the reference talker profile.

In some embodiments, the method 1500 includes, during or following receipt of at least a portion of the audio data, receiving input indicating user-specified hearing assistance settings from the user of the hearing assistance device. For example, the user can manually adjust the hearing assistance settings of the hearing assistance device using an app or by interacting with controls of the hearing assistance device. In such embodiments, the method 1500 can also include storing the user-specified hearing assistance settings and a talker profile at a memory and updating configuration of the hearing assistance device based on the user-specified hearing assistance settings. The talker profile includes talker-specific data to enable mapping of the user-specified hearing assistance settings to the talker profile.

In some embodiments, updating the configuration of the hearing assistance device based on the user-specified hearing assistance settings includes adjusting parameters of a machine-learning model that is configured to determine the hearing assistance settings used to configure the hearing assistance device. For example, the machine-learning model can be trained via reinforcement learning based on a reward predictor that is customized to the hearing characteristics of the user. In this example, the parameters of the machine-learning model, the parameters of the reward predictor, or both, can be modified based on the user-specific hearing assistance settings.

In some embodiments, the method 1500 enables dynamic reconfiguration of the hearing assistance settings to improve the user's ability to understand a variety of voices. For example, the method 1500 can enable the hearing assistance device to be reconfigured as the persons speaking during a conversation changes. In such embodiments, during a conversation among the user, a target talker, and a second target talker, audio data and second audio data can be captured, where the audio data includes speech from the target talker and the second audio data includes speech from the second target talker. In this example, the method 1500 includes obtaining the second audio data for playout to the user and obtaining second hearing assistance settings that are based on second voice characteristics of the second target talker associated with the second audio data and based on the hearing characteristics of the user. The method 1500 also includes configuring the hearing assistance device to adjust the playout audio characteristics of the second audio data based on the second hearing assistance settings. To illustrate, the hearing assistance device can be updated to use the second hearing assistance settings in response to detecting the second target talker.

The method 1500 of FIG. 15 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1500 of FIG. 15 may be performed by a processor that executes instructions, such as described with reference to FIG. 16.

Figure 16:
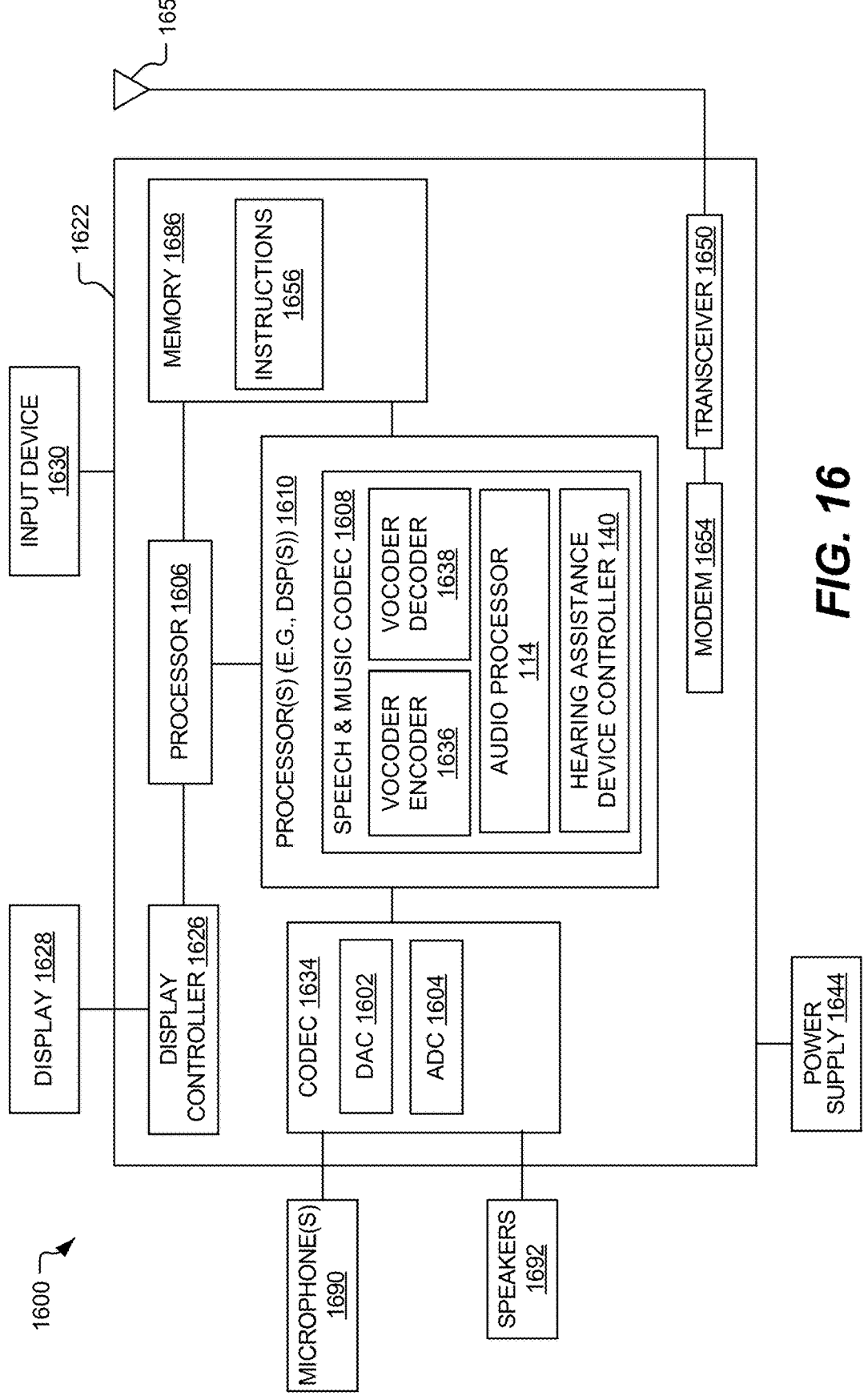
FIG. 16 is a block diagram of a particular illustrative example of a device that is operable to adjust hearing assistance settings of a hearing assistance device in accordance with some examples of the present disclosure.

Referring to FIG. 16, a block diagram of a particular illustrative implementation of a device is depicted and generally designated 1600. In various implementations, the device 1600 may have more or fewer components than illustrated in FIG. 16. In an illustrative implementation, the device 1600 may correspond to the device 110, the device

120, or both. In an illustrative implementation, the device 1600 may perform one or more operations described with reference to FIGS. 1-15.

In a particular implementation, the device 1600 includes a processor 1606 (e.g., a central processing unit (CPU)). The device 1600 may include one or more additional processors 1610 (e.g., one or more DSPs). In a particular aspect, the processor(s) 190 of FIG. 1 correspond to, include, or are included within the processor 1606, the processors 1610, or a combination thereof. Additionally, or alternatively, the audio processor 114 of FIG. 1 can correspond to, include, or be included within the processor 1606, the processors 1610, or a combination thereof. The processors 1610 may include a speech and music coder-decoder (CODEC) 1608 that includes a voice coder ("vocoder") encoder 1636, a vocoder decoder 1638, the hearing assistance device controller 140, the audio processor 114, or a combination thereof.

The device 1600 may include a memory 1686 and a CODEC 1634. The memory 1686 may include instructions 1656, that are executable by the one or more additional processors 1610 (or the processor 1606) to implement the functionality described with reference to the hearing assistance device controller 140, the audio processor, or both. The device 1600 may include the modem 1654 coupled, via a transceiver 1650, to an antenna 1652. For example, the modem 1654 can be configured to send hearing assistance settings determined by the hearing assistance device controller 140 to another device (e.g., a hearing assistance device). Alternatively, the modem 1654 can be configured to receive hearing assistance settings from a remote device.

The device 1600 may include a display 1628 coupled to a display controller 1626. One or more speakers 1692 and/or one or more microphones 1690 may be coupled to the CODEC 1634. The CODEC 1634 may include a digital-to-analog converter (DAC) 1602, an analog-to-digital converter (ADC) 1604, or both. In a particular implementation, the CODEC 1634 may receive analog signals from the microphone(s) 1690, convert the analog signals to digital signals using the analog-to-digital converter 1604, and provide the digital signals to the speech and music codec 1608. The speech and music codec 1608 may process the digital signals, and the digital signals may further be processed by the hearing assistance device controller 140, the audio processor 114, or both. In a particular implementation, the speech and music codec 1608 may provide digital signals to the CODEC 1634. The CODEC 1634 may convert the digital signals to analog signals using the digital-to-analog converter 1602 and may provide the analog signals to the speaker(s) 1692.

In a particular implementation, the device 1600 may be included in a system-in-package or system-on-chip device 1622. In a particular implementation, the memory 1686, the processor 1606, the processors 1610, the display controller 1626, the CODEC 1634, the modem 1654, and the transceiver 1650 are included in the system-in-package or system-on-chip device 1622. In a particular implementation, an input device 1630 and a power supply 1644 are coupled to the system-in-package or the system-on-chip device 1622. Moreover, in a particular implementation, as illustrated in FIG. 16, the display 1628, the input device 1630, the speaker(s) 1692, the microphone(s) 1690, the antenna 1652, and the power supply 1644 are external to the system-in-package or the system-on-chip device 1622. In a particular implementation, each of the display 1628, the input device 1630, the speaker(s) 1692, the microphone(s) 1690, the antenna 1652, and the power supply 1644 may be coupled to a component of the system-in-package or the system-on-chip device 1622, such as an interface or a controller.

The device 1600 may include a mobile communication device, a smart phone, a cellular phone, a laptop computer, a computer, a tablet, a personal digital assistant, a display device, a headset, an augmented reality headset, a mixed reality headset, a virtual reality headset, a portable electronic device, a computing device, a communication device, an internet-of-things (IoT) device, a virtual reality (VR) device, a hearing assistance device, one or more earbuds, an in-ear device, an over-ear device, an on-ear device, a mobile device, or any combination thereof.

In conjunction with the described implementations, an apparatus includes means for obtaining audio data for playout to a user. For example, the means for obtaining audio data for playout to a user can correspond to the hearing assistance device 110, the microphone(s) 112, the audio processor 114, the device 120, the transceiver 126, the processor(s) 190, the microphone(s) 1690, the codec 1634, the processor 1606, the processor(s) 1610, the speech and music codec 1608, the modem 1654, one or more other circuits or components configured to obtain audio data for playout to a user, or any combination thereof.

The apparatus also includes means for obtaining hearing assistance settings that are based on voice characteristics of a target talker associated with the audio data and based on hearing characteristics of the user. For example, the means for obtaining the hearing assistance settings can correspond to the hearing assistance device 110, the transceiver 118, the audio processor 114, the device 120, the processor(s) 190, the processor 1606, the processor(s) 1610, the speech and music codec 1608, the modem 1654, one or more other circuits or components configured to obtain the hearing assistance settings, or a combination thereof.

The apparatus also includes means for configuring a hearing assistance device to adjust playout audio characteristics of the audio data based on the hearing assistance settings. For example, the means for configuring the hearing assistance device to adjust playout audio characteristics of audio data based on the hearing assistance settings can correspond to the hearing assistance device 110, the transceiver 118, the audio processor 114, the device 120, the processor(s) 190, the processor 1606, the processor(s) 1610, the speech and music codec 1608, one or more other circuits or components configured to configure a hearing assistance device, or a combination thereof.

In some implementations, a non-transitory computer-readable medium (e.g., a computer-readable storage device, such as the memory 122 or the memory 1686) includes instructions (e.g., the instructions 1656) that, when executed by one or more processors (e.g., the processor(s) 190, the processor(s) 1610, or the processor 1606), cause the one or more processors to obtain audio data for playout to a user; obtain hearing assistance settings that are based on voice characteristics of a target talker associated with the audio data and based on hearing characteristics of the user; and configure a hearing assistance device to adjust playout audio characteristics of the audio data based on the hearing assistance settings.

Particular aspects of the disclosure are described below in sets of interrelated Examples:

According to Example 1, a device includes a memory configured to store audio data; and one or more processors configured to obtain audio data for playout to a user; obtain hearing assistance settings that are based on voice characteristics of a target talker associated with the audio data and based on hearing characteristics of the user; and configure a hearing assistance device to adjust playout audio characteristics of the audio data based on the hearing assistance settings.

Example 2 includes the device of Example 1, wherein the hearing assistance settings indicate one or more spectral processing parameters.

Example 3 includes the device of Example 1 or Example 2, wherein the hearing assistance settings indicate one or more filter parameters.

Example 4 includes the device of any of Examples 1 to 3, wherein the hearing assistance settings indicate one or more directional audio parameters.

Example 5 includes the device of any of Examples 1 to 4, wherein the hearing assistance settings indicate one or more noise suppression parameters.

Example 6 includes the device of any of Examples 1 to 5, wherein the one or more processors are configured to obtain talker-specific data associated with the audio data; and determine, based on the talker-specific data, whether a talker profile for the target talker is available in a database that maps talker profiles to corresponding hearing assistance settings.

Example 7 includes the device of Example 6, wherein the hearing assistance settings identified in the database include user-specified hearing assistance settings.

Example 8 includes the device of Example 6 or Example 7, wherein the one or more processors are configured to, based on a determination that no talker profile for the target talker is available, update the database based on the talker-specific data for the target talker to generate a new talker profile associated with the target talker.

Example 9 includes the device of any of Examples 6 to 8, wherein the one or more processors are configured to, based on a determination that the talker profile for the target talker is available, use the corresponding hearing assistance settings to configure the hearing assistance device.

Example 10 includes the device of any of Examples 6 to 9, wherein the one or more processors are configured to determine a target talker embedding based on the talker-specific data; and select as the talker profile a reference talker profile from among a plurality of reference talker profiles, wherein the reference talker profile is selected based on a distance in embedding space between the target talker embedding and a reference talker embedding associated with the reference talker profile.

Example 11 includes the device of Example 10, wherein the one or more processors are configured to determine a target talker embedding based on the talker-specific data; and based on a determination that no reference talker embedding is within a threshold distance of the target talker embedding in an embedding space: generate a reference talker profile corresponding to the talker profile; determine the hearing assistance settings based on a machine-learning model; and associate the hearing assistance settings with the reference talker profile.

Example 12 includes the device of Example 11, wherein the machine-learning model is trained based on the hearing characteristics of the user.

Example 13 includes the device of any of Examples 6 to 12, wherein the talker-specific data includes audio features extracted from the audio data.

Example 14 includes the device of any of Examples 6 to 13, wherein the talker-specific data includes one or more images captured concurrently with capture of the audio data.

Example 15 includes the device of any of Examples 6 to 14, wherein the talker-specific data includes sensor data captured concurrently with capture of the audio data.

Example 16 includes the device of any of Examples 6 to 15, wherein the talker-specific data includes metadata associated with the audio data.

Example 17 includes the device of Example 16, wherein the metadata includes caller identification data associated with a communication session.

Example 18 includes the device of Example 16, wherein the metadata includes an active speaker identifier associated with a communication session.

Example 19 includes the device of any of Examples 1 to 18, wherein the one or more processors are configured to during or following receipt of at least a portion of the audio data, receive input indicating user-specified hearing assistance settings from the user of the hearing assistance device; store the user-specified hearing assistance settings and a talker profile at the memory; and update configuration of the hearing assistance device based on the user-specified hearing assistance settings.

Example 20 includes the device of Example 19, wherein the talker profile includes talker-specific data to enable mapping of the user-specified hearing assistance settings to the talker profile.

Example 21 includes the device of Example 19, wherein, to update the configuration of the hearing assistance device based on the user-specified hearing assistance settings, the one or more processors are configured to adjust parameters of a machine-learning model that is configured to determine the hearing assistance settings used to configure the hearing assistance device.

Example 22 includes the device of Example 21, wherein the machine-learning model is trained via reinforcement learning based on a reward predictor that is customized to the hearing characteristics of the user.

Example 23 includes the device of any of Examples 1 to 22, wherein the one or more processors are configured to obtain second audio data for playout to the user; obtain second hearing assistance settings that are based on second voice characteristics of a second target talker associated with the second audio data and based on the hearing characteristics of the user; and configure the hearing assistance device to adjust the playout audio characteristics of the second audio data based on the second hearing assistance settings.

Example 24 includes the device of Example 23, wherein the audio data and the second audio data are captured during a conversation among the user, the target talker, and the second target talker.

Example 25 includes the device of Example 23 or Example 24, wherein the one or more processors are configured to update the hearing assistance device based on the second hearing assistance settings in response to detecting the second target talker.

Example 26 includes the device of any of Examples 1 to 25 and further includes a modem coupled to the one or more processors and configured to obtain the hearing assistance settings from a remote device.

Example 27 includes the device of any of Examples 1 to 26 and further includes a modem coupled to the one or more processors and configured to send the hearing assistance settings to the hearing assistance device.

Example 28 includes the device of any of Examples 1 to 27, wherein the one or more processors are integrated within a mobile computing device.

Example 29 includes the device of any of Examples 1 to 27, wherein the one or more processors are integrated within the hearing assistance device.

Example 30 includes the device of any of Examples 1 to 29 and further includes one or more microphones coupled to the one or more processors and configured to capture the audio data.

According to Example 31, a method includes obtaining audio data for playout to a user; obtaining hearing assistance settings that are based on voice characteristics of a target talker associated with the audio data and based on hearing characteristics of the user; and configuring a hearing assistance device to adjust playout audio characteristics of the audio data based on the hearing assistance settings.

Example 32 includes the method of Example 31, wherein the hearing assistance settings indicate one or more spectral processing parameters.

Example 33 includes the method of Example 31 or Example 32, wherein the hearing assistance settings indicate one or more filter parameters.

Example 34 includes the method of any of Examples 31 to 33, wherein the hearing assistance settings indicate one or more directional audio parameters.

Example 35 includes the method of any of Examples 31 to 34, wherein the hearing assistance settings indicate one or more noise suppression parameters.

Example 36 includes the method of any of Examples 31 to 35 and further includes obtaining talker-specific data associated with the audio data; and determining, based on the talker-specific data, whether a talker profile for the target talker is available in a database that maps talker profiles to corresponding hearing assistance settings.

Example 37 includes the method of Example 36, wherein the hearing assistance settings identified in the database include user-specified hearing assistance settings.

Example 38 includes the method of Example 36 or Example 37 and further includes, based on a determination that no talker profile for the target talker is available, updating the database based on the talker-specific data for the target talker to generate a new talker profile associated with the target talker.

Example 39 includes the method of any of Examples 36 to 38 and further includes, based on a determination that the talker profile for the target talker is available, using the corresponding hearing assistance settings to configure the hearing assistance device.

Example 40 includes the method of any of Examples 36 to 39 and further includes determining a target talker embedding based on the talker-specific data; and selecting as the talker profile a reference talker profile from among a plurality of reference talker profiles, wherein the reference talker profile is selected based on a distance in embedding space between the target talker embedding and a reference talker embedding associated with the reference talker profile.

Example 41 includes the method of Example 40 and further includes determining a target talker embedding based on the talker-specific data; and based on a determination that no reference talker embedding is within a threshold distance of the target talker embedding in an embedding space: generating a reference talker profile corresponding to the talker profile; determining the hearing assistance settings based on a machine-learning model; and associating the hearing assistance settings with the reference talker profile.

Example 42 includes the method of Example 41, wherein the machine-learning model is trained based on the hearing characteristics of the user.

Example 43 includes the method of any of Examples 36 to 42, wherein the talker-specific data includes audio features extracted from the audio data.

Example 44 includes the method of any of Examples 36 to 43, wherein the talker-specific data includes one or more images captured concurrently with capture of the audio data.

Example 45 includes the method of any of Examples 36 to 44, wherein the talker-specific data includes sensor data captured concurrently with capture of the audio data.

Example 46 includes the method of any of Examples 36 to 45, wherein the talker-specific data includes metadata associated with the audio data.

Example 47 includes the method of Example 46, wherein the metadata includes caller identification data associated with a communication session.

Example 48 includes the method of Example 46, wherein the metadata includes an active speaker identifier associated with a communication session.

Example 49 includes the method of any of Examples 31 to 48 and further includes, during or following receipt of at least a portion of the audio data, receiving input indicating user-specified hearing assistance settings from the user of the hearing assistance device; storing the user-specified hearing assistance settings and a talker profile at a memory; and updating configuration of the hearing assistance device based on the user-specified hearing assistance settings.

Example 50 includes the method of Example 49, wherein the talker profile includes talker-specific data to enable mapping of the user-specified hearing assistance settings to the talker profile.

Example 51 includes the method of Example 49, wherein updating the configuration of the hearing assistance device based on the user-specified hearing assistance settings comprises adjusting parameters of a machine-learning model that is configured to determine the hearing assistance settings used to configure the hearing assistance device.

Example 52 includes the method of Example 51, wherein the machine-learning model is trained via reinforcement learning based on a reward predictor that is customized to the hearing characteristics of the user.

Example 53 includes the method of any of Examples 31 to 52 and further includes obtaining second audio data for playout to the user; obtaining second hearing assistance settings that are based on second voice characteristics of a second target talker associated with the second audio data and based on the hearing characteristics of the user; and configuring the hearing assistance device to adjust the playout audio characteristics of the second audio data based on the second hearing assistance settings.

Example 54 includes the method of Example 53, wherein the audio data and the second audio data are captured during a conversation among the user, the target talker, and the second target talker.

Example 55 includes the method of Example 53 or Example 54 and further includes updating the hearing assistance device based on the second hearing assistance settings in response to detecting the second target talker.

According to Example 56, a non-transitory computer-readable storage device stores instructions executable by one or more processors to cause the one or more processors to obtain audio data for playout to a user; obtain hearing assistance settings that are based on voice characteristics of a target talker associated with the audio data and based on hearing characteristics of the user; and configure a hearing assistance device to adjust playout audio characteristics of the audio data based on the hearing assistance settings.

Example 57 includes the non-transitory computer-readable storage device of Example 56, wherein the hearing assistance settings indicate one or more spectral processing parameters.

Example 58 includes the non-transitory computer-readable storage device of Example 56 or Example 57, wherein the hearing assistance settings indicate one or more filter parameters.

Example 59 includes the non-transitory computer-readable storage device of any of Examples 56 to 58, wherein the hearing assistance settings indicate one or more directional audio parameters.

Example 60 includes the non-transitory computer-readable storage device of any of Examples 56 to 59, wherein the hearing assistance settings indicate one or more noise suppression parameters.

Example 61 includes the non-transitory computer-readable storage device of any of Examples 56 to 60, wherein the instructions are executable to cause the one or more processors to obtain talker-specific data associated with the audio data; and determine, based on the talker-specific data, whether a talker profile for the target talker is available in a database that maps talker profiles to corresponding hearing assistance settings.

Example 62 includes the non-transitory computer-readable storage device of Example 61, wherein the hearing assistance settings identified in the database include user-specified hearing assistance settings.

Example 63 includes the non-transitory computer-readable storage device of Example 61 or Example 62, wherein the instructions are executable to cause the one or more processors to, based on a determination that no talker profile for the target talker is available, update the database based on the talker-specific data for the target talker to generate a new talker profile associated with the target talker.

Example 64 includes the non-transitory computer-readable storage device of any of Examples 61 to 63, wherein the instructions are executable to cause the one or more processors to, based on a determination that the talker profile for the target talker is available, use the corresponding hearing assistance settings to configure the hearing assistance device.

Example 65 includes the non-transitory computer-readable storage device of any of Examples 61 to 64, wherein the instructions are executable to cause the one or more processors to determine a target talker embedding based on the talker-specific data; and select as the talker profile a reference talker profile from among a plurality of reference talker profiles, wherein the reference talker profile is selected based on a distance in embedding space between the target talker embedding and a reference talker embedding associated with the reference talker profile.

Example 66 includes the non-transitory computer-readable storage device of Example 65, wherein the instructions are executable to cause the one or more processors to determine a target talker embedding based on the talker-specific data; and based on a determination that no reference talker embedding is within a threshold distance of the target talker embedding in an embedding space: generate a reference talker profile corresponding to the talker profile; determine the hearing assistance settings based on a machine-learning model; and associate the hearing assistance settings with the reference talker profile.

Example 67 includes the non-transitory computer-readable storage device of Example 66, wherein the machine-learning model is trained based on the hearing characteristics of the user.

Example 68 includes the non-transitory computer-readable storage device of any of Examples 61 to 67, wherein the talker-specific data includes audio features extracted from the audio data.

Example 69 includes the non-transitory computer-readable storage device of any of Examples 61 to 68, wherein the talker-specific data includes one or more images captured concurrently with capture of the audio data.

Example 70 includes the non-transitory computer-readable storage device of any of Examples 61 to 69, wherein the talker-specific data includes sensor data captured concurrently with capture of the audio data.

Example 71 includes the non-transitory computer-readable storage device of any of Examples 61 to 70, wherein the talker-specific data includes metadata associated with the audio data.

Example 72 includes the non-transitory computer-readable storage device of Example 71, wherein the metadata includes caller identification data associated with a communication session.

Example 73 includes the non-transitory computer-readable storage device of Example 71, wherein the metadata includes an active speaker identifier associated with a communication session.

Example 74 includes the non-transitory computer-readable storage device of any of Examples 56 to 73, wherein the instructions are executable to cause the one or more processors to during or following receipt of at least a portion of the audio data, receive input indicating user-specified hearing assistance settings from the user of the hearing assistance device; store the user-specified hearing assistance settings and a talker profile at a memory; and update configuration of the hearing assistance device based on the user-specified hearing assistance settings.

Example 75 includes the non-transitory computer-readable storage device of Example 74, wherein the talker profile includes talker-specific data to enable mapping of the user-specified hearing assistance settings to the talker profile.

Example 76 includes the non-transitory computer-readable storage device of Example 74, wherein, to update the configuration of the hearing assistance device based on the user-specified hearing assistance settings, the instructions are executable to cause the one or more processors to adjust parameters of a machine-learning model that is configured to determine the hearing assistance settings used to configure the hearing assistance device.

Example 77 includes the non-transitory computer-readable storage device of Example 76, wherein the machine-learning model is trained via reinforcement learning based on a reward predictor that is customized to the hearing characteristics of the user.

Example 78 includes the non-transitory computer-readable storage device of any of Examples 56 to 77, wherein the instructions are executable to cause the one or more processors to obtain second audio data for playout to the user; obtain second hearing assistance settings that are based on second voice characteristics of a second target talker associated with the second audio data and based on the hearing characteristics of the user; and configure the hearing assistance device to adjust the playout audio characteristics of the second audio data based on the second hearing assistance settings.

Example 79 includes the non-transitory computer-readable storage device of Example 78, wherein the audio data and the second audio data are captured during a conversation among the user, the target talker, and the second target talker.

Example 80 includes the non-transitory computer-readable storage device of Example 78 or Example 79, wherein the instructions are executable to cause the one or more processors to update the hearing assistance device based on the second hearing assistance settings in response to detecting the second target talker.

According to Example 81, an apparatus includes means for obtaining audio data for playout to a user; means for obtaining hearing assistance settings that are based on voice characteristics of a target talker associated with the audio data and based on hearing characteristics of the user; and means for configuring a hearing assistance device to adjust playout audio characteristics of the audio data based on the hearing assistance settings.

Example 82 includes the apparatus of Example 81, wherein the hearing assistance settings indicate one or more spectral processing parameters.

Example 83 includes the apparatus of Example 81 or Example 82, wherein the hearing assistance settings indicate one or more filter parameters.

Example 84 includes the apparatus of any of Examples 81 to 83, wherein the hearing assistance settings indicate one or more directional audio parameters.

Example 85 includes the apparatus of any of Examples 81 to 84, wherein the hearing assistance settings indicate one or more noise suppression parameters.

Example 86 includes the apparatus of any of Examples 81 to 85 and further includes means for obtaining talker-specific data associated with the audio data; and means for determining, based on the talker-specific data, whether a talker profile for the target talker is available in a database that maps talker profiles to corresponding hearing assistance settings.

Example 87 includes the apparatus of Example 86, wherein the hearing assistance settings identified in the database include user-specified hearing assistance settings.

Example 88 includes the apparatus of Examples 86 or Example 87 and further includes, means for updating the database, based on a determination that no talker profile for the target talker is available, wherein the database is updated based on the talker-specific data for the target talker to generate a new talker profile associated with the target talker.

Example 89 includes the apparatus of any of Examples 86 to 88 and further includes means for using the corresponding hearing assistance settings to configure the hearing assistance device based on a determination that the talker profile for the target talker is available.

Example 90 includes the apparatus of any of Examples 86 to 89 and further includes means for determining a target talker embedding based on the talker-specific data; and means for selecting as the talker profile a reference talker profile from among a plurality of reference talker profiles, wherein the reference talker profile is selected based on a distance in embedding space between the target talker embedding and a reference talker embedding associated with the reference talker profile.

Example 91 includes the apparatus of Example 90 and further includes means for determining a target talker embedding based on the talker-specific data; means for generating a reference talker profile corresponding to the talker profile based on a determination that no reference talker embedding is within a threshold distance of the target talker embedding in an embedding space; means for determining the hearing assistance settings based on a machine-learning model; and means for associating the hearing assistance settings with the reference talker profile.

Example 92 includes the apparatus of Example 91, wherein the machine-learning model is trained based on the hearing characteristics of the user.

Example 93 includes the apparatus of any of Examples 86 to 92, wherein the talker-specific data includes audio features extracted from the audio data.

Example 94 includes the apparatus of any of Examples 86 to 93, wherein the talker-specific data includes one or more images captured concurrently with capture of the audio data.

Example 95 includes the apparatus of any of Examples 86 to 94, wherein the talker-specific data includes sensor data captured concurrently with capture of the audio data.

Example 96 includes the apparatus of any of Examples 86 to 95, wherein the talker-specific data includes metadata associated with the audio data.

Example 97 includes the apparatus of Example 96, wherein the metadata includes caller identification data associated with a communication session.

Example 98 includes the apparatus of Example 96, wherein the metadata includes an active speaker identifier associated with a communication session.

Example 99 includes the apparatus of any of Examples 81 to 98 and further includes means for receiving input during or following receipt of at least a portion of the audio data, the input indicating user-specified hearing assistance settings from the user of the hearing assistance device; means for storing the user-specified hearing assistance settings and a talker profile at a memory; and means for updating configuration of the hearing assistance device based on the user-specified hearing assistance settings.

Example 100 includes the apparatus of Example 99, wherein the talker profile includes talker-specific data to enable mapping of the user-specified hearing assistance settings to the talker profile.

Example 101 includes the apparatus of Example 99 or Example 100, wherein the means for updating the configuration of the hearing assistance device based on the user-specified hearing assistance settings comprises means for adjusting parameters of a machine-learning model that is configured to determine the hearing assistance settings used to configure the hearing assistance device.

Example 102 includes the apparatus of Example 101, wherein the machine-learning model is trained via reinforcement learning based on a reward predictor that is customized to the hearing characteristics of the user.

Example 103 includes the apparatus of any of Examples 81 to 102 and further includes means for obtaining second audio data for playout to the user; means for obtaining second hearing assistance settings that are based on second voice characteristics of a second target talker associated with the second audio data and based on the hearing characteristics of the user; and means for configuring the hearing assistance device to adjust the playout audio characteristics of the second audio data based on the second hearing assistance settings.

Example 104 includes the apparatus of Example 103, wherein the audio data and the second audio data are captured during a conversation among the user, the target talker, and the second target talker.

Example 105 includes the apparatus of Example 103 or Example 104 and further includes means for updating the hearing assistance device based on the second hearing assistance settings in response to detecting the second target talker.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a memory configured to store audio data; and
one or more processors configured to:
obtain audio data for playout to a user;
obtain hearing assistance settings that are based on voice characteristics of a target talker associated with the audio data and based on hearing characteristics of the user; and
configure a hearing assistance device to adjust playout audio characteristics of the audio data based on the hearing assistance settings.

2. The device of claim 1, wherein the hearing assistance settings indicate one or more spectral processing parameters, one or more filter parameters, one or more directional audio parameters, one or more noise suppression parameters, or a combination thereof.

3. The device of claim 1, wherein the one or more processors are configured to:
obtain talker-specific data associated with the audio data; and
determine, based on the talker-specific data, whether a talker profile for the target talker is available in a database that maps talker profiles to corresponding hearing assistance settings.

4. The device of claim 3, wherein the hearing assistance settings identified in the database include user-specified hearing assistance settings.

5. The device of claim 3, wherein the one or more processors are configured to, based on a determination that no talker profile for the target talker is available, update the database based on the talker-specific data for the target talker to generate a new talker profile associated with the target talker.

6. The device of claim 3, wherein the one or more processors are configured to:

determine a target talker embedding based on the talker-specific data; and select as the talker profile a reference talker profile from among a plurality of reference talker profiles, wherein the reference talker profile is selected based on a distance in embedding space between the target talker embedding and a reference talker embedding associated with the reference talker profile.

7. The device of claim 6, wherein the one or more processors are configured to:

determine a target talker embedding based on the talker-specific data; and based on a determination that no reference talker embedding is within a threshold distance of the target talker embedding in an embedding space:

generate a reference talker profile corresponding to the talker profile;

determine the hearing assistance settings based on a machine-learning model; and associate the hearing assistance settings with the reference talker profile.

8. The device of claim 3, wherein the talker-specific data includes audio features extracted from the audio data, one or more images captured concurrently with capture of the audio data, sensor data captured concurrently with capture of the audio data, metadata associated with the audio data, or a combination thereof.

9. The device of claim 1, wherein the one or more processors are configured to:

during or following receipt of at least a portion of the audio data, receive input indicating user-specified hearing assistance settings from the user of the hearing assistance device;

store the user-specified hearing assistance settings and a talker profile at the memory; and update configuration of the hearing assistance device based on the user-specified hearing assistance settings.

10. The device of claim 9, wherein, to update the configuration of the hearing assistance device based on the user-specified hearing assistance settings, the one or more processors are configured to adjust parameters of a machine-learning model that is configured to determine the hearing assistance settings used to configure the hearing assistance device.

11. The device of claim 10, wherein the machine-learning model is trained via reinforcement learning based on a reward predictor that is customized to the hearing characteristics of the user.

12. The device of claim 1, wherein the one or more processors are configured to:

obtain second audio data for playout to the user;

obtain second hearing assistance settings that are based on second voice characteristics of a second target talker associated with the second audio data and based on the hearing characteristics of the user; and

32 configure the hearing assistance device to adjust the playout audio characteristics of the second audio data based on the second hearing assistance settings.

13. The device of claim 1, further comprising a modem coupled to the one or more processors and configured to obtain the hearing assistance settings from a remote device, to send the hearing assistance settings to the hearing assistance device, or both.

14. The device of claim 1, further comprising one or more microphones coupled to the one or more processors and configured to capture the audio data, wherein the one or more processors are integrated within the hearing assistance device.

15. The device of claim 1, further comprising one or more speakers coupled to the one or more processors and configured to playout the audio data as adjusted based on the hearing assistance settings.

16. A method comprising:

obtaining audio data for playout to a user;

obtaining hearing assistance settings that are based on voice characteristics of a target talker associated with the audio data and based on hearing characteristics of the user; and configuring a hearing assistance device to adjust playout audio characteristics of the audio data based on the hearing assistance settings.

17. The method of claim 16, further comprising:

obtaining talker-specific data associated with the audio data; and determining, based on the talker-specific data, whether a talker profile for the target talker is available in a database that maps talker profiles to corresponding hearing assistance settings.

18. The method of claim 17, further comprising:

determining a target talker embedding based on the talker-specific data; and selecting as the talker profile a reference talker profile from among a plurality of reference talker profiles, wherein the reference talker profile is selected based on a distance in embedding space between the target talker embedding and a reference talker embedding associated with the reference talker profile.

19. The method of claim 16, further comprising:

during a conversation among the user, the target talker, and a second target talker, obtaining second audio data for playout to the user;

obtaining second hearing assistance settings that are based on second voice characteristics of the second target talker associated with the second audio data and based on the hearing characteristics of the user; and configuring the hearing assistance device to adjust the playout audio characteristics of the second audio data based on the second hearing assistance settings.

20. A non-transitory computer-readable storage device storing instructions executable by one or more processors to cause the one or more processors to:

obtain audio data for playout to a user;

obtain hearing assistance settings that are based on voice characteristics of a target talker associated with the audio data and based on hearing characteristics of the user; and configure a hearing assistance device to adjust playout audio characteristics of the audio data based on the hearing assistance settings.

* * * * *